United States Patent
Chung

(10) Patent No.: US 11,462,043 B2
(45) Date of Patent: Oct. 4, 2022

(54) SYSTEM, DEVICE, METHOD RELATED TO FINGERPRINT SENSING

(71) Applicant: NOVATEK MICROELECTRONICS CORP., Hsinchu (TW)

(72) Inventor: Jung-Chen Chung, Hsinchu County (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 17/211,865

(22) Filed: Mar. 25, 2021

(65) Prior Publication Data

US 2021/0303815 A1 Sep. 30, 2021

Related U.S. Application Data

(60) Provisional application No. 62/994,328, filed on Mar. 25, 2020.

(51) Int. Cl.
*G06V 40/13* (2022.01)
*G06F 3/044* (2006.01)
*G06V 40/12* (2022.01)

(52) U.S. Cl.
CPC ............ *G06V 40/13* (2022.01); *G06F 3/044* (2013.01); *G06V 40/1306* (2022.01); *G06V 40/1318* (2022.01); *G06V 40/1365* (2022.01)

(58) Field of Classification Search
CPC ............ G06V 40/13; G06V 40/1318; G06V 40/1365; G06V 40/1306; G06F 3/044
See application file for complete search history.

(56) References Cited

U.S. PATENT DOCUMENTS

| 5,051,625 A | * | 9/1991 | Ikeda | H03K 19/00361 326/86 |
| 2003/0020028 A1 | * | 1/2003 | Iihama | G06V 40/1318 348/E5.037 |
| 2004/0251940 A1 | * | 12/2004 | Hayashi | H03K 19/018585 327/170 |
| 2005/0244037 A1 | * | 11/2005 | Chiu | G06F 21/32 382/124 |
| 2006/0168466 A1 | * | 7/2006 | Choate | G06F 13/4282 713/600 |
| 2007/0091054 A1 | * | 4/2007 | Lee | G11C 19/28 345/100 |

(Continued)

*Primary Examiner* — Stephen G Sherman
(74) *Attorney, Agent, or Firm* — JCIPRNET

(57) ABSTRACT

Various aspects or embodiments of fingerprint sensing are described, for use in fingerprint sensing, for example, over a portion or whole of a screen of a computing device, such as smart phones, tablet computers or other information processing devices. An electronic module, computing apparatus, and a panel are provided. The electronic module includes a slew rate configuring circuit to generate and transmit at least one output signal to a gate on array (GOA) circuit of the panel; and a fingerprint sensing control circuit, coupled to fingerprint sensing elements of the panel, to generate and transmit control signals to the GOA circuit, wherein the fingerprint sensing control circuit controls the GOA circuit to generate reset signals according to the at least one output signal to reset the fingerprint sensing elements respectively and the slew rate configuring circuit controls a slew rate of a falling edge of each reset signal.

26 Claims, 38 Drawing Sheets

(56) References Cited

U.S. PATENT DOCUMENTS

| | | | |
|---|---|---|---|
| 2011/0012932 A1* | 1/2011 | Morimoto | G09G 3/20 |
| | | | 345/690 |
| 2012/0105338 A1* | 5/2012 | Lin | G11C 19/28 |
| | | | 377/79 |
| 2014/0226879 A1* | 8/2014 | Westerman | G06V 40/13 |
| | | | 382/125 |
| 2017/0031477 A1* | 2/2017 | Jamshidi Roudbari | |
| | | | G09G 3/3266 |

\* cited by examiner

SYSTEM, DEVICE, METHOD RELATED TO FINGERPRINT SENSING

CROSS-REFERENCE TO RELATED APPLICATION

This non-provisional application claims priority under 35 U.S.C. § 119(e) on U.S. provisional Patent Application No(s). 62/994,328 filed on Mar. 25, 2020, the entire contents of which are hereby incorporated by reference.

BACKGROUND OF THE INVENTION

1. Field of the Invention

The present disclosure relates to technologies for fingerprint sensing and particularly to systems, devices, methods related to fingerprint sensing implemented in a single chip for a computing device, and an electronic module, a computing apparatus, and a panel related to fingerprint sensing.

2. Description of the Related Art

For computing devices, such as smart phones, tablet computers or other information processing devices, touch screens have become indispensable components of the computing devices for user interactions. A user can give input or control the computing device through single-touch or multi-touch gestures by touching the touch screen with one or more fingers or a special stylus.

Further, demand for fingerprint sensing over a portion of the touch screen or whole touch screen continues to increase.

BRIEF SUMMARY OF THE INVENTION

Various aspects or embodiments about implementations of fingerprint sensing are described, for use in fingerprint sensing, for example, over a portion of a screen or whole screen of a computing device (such as smart phones, tablet computers or other information processing devices).

In accordance with a first aspect of the disclosure, systems, devices, and methods for a fingerprint sensing driver (or chip) to provide a pre-scanned fingerprint pattern to an application are introduced.

In accordance with a second aspect of the disclosure, systems, devices, and methods for adjustment of slew rate of signals for a fingerprint sensing driver or FDTI chip are introduced.

In accordance with a third aspect of the disclosure, systems, devices, and methods for dynamic offset adjustment in a fingerprint sensing driver or FDTI chip are introduced.

In accordance with a fourth aspect of the disclosure, systems, devices, and methods for adjustment of reference voltage in a fingerprint sensing driver or FDTI chip are introduced.

DETAILED DESCRIPTION OF THE INVENTION

Figure 1A:
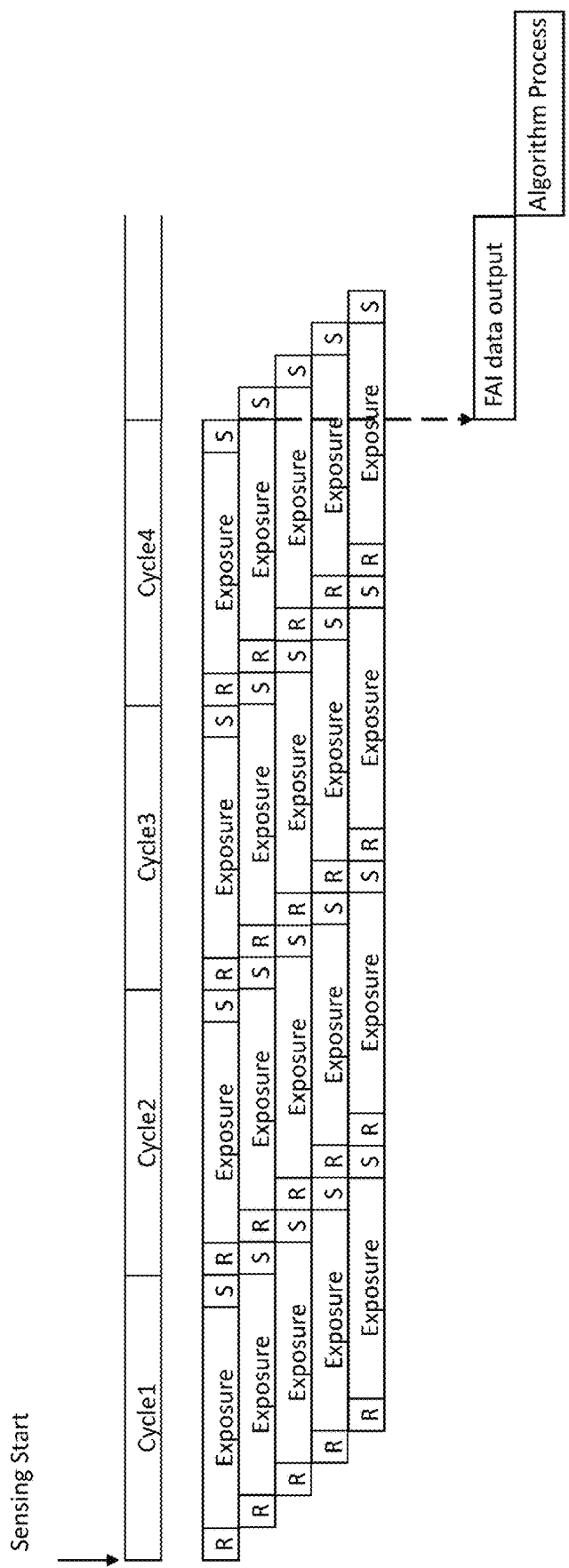
FIG. 1A schematically shows that a fingerprint sensing driver or chip undergoes multiple cycles to capture final plane average fingerprint images for use by an application (for executing a corresponding algorithm).

Embodiments of the present disclosure will be described below with reference to the accompanying drawing. Various modifications to the embodiments and the features described herein will be readily apparent to those skilled in the art. Thus, the present disclosure is not intended to be limited to the embodiments shown, but is to be accorded the widest scope consistent with the principles and features described herein. Accordingly, certain aspects of the subject disclosure are described or depicted herein for the purposes of illustration and not limitation.

First, systems, devices, or methods for a fingerprint sensing driver (or chip) to provide a pre-scanned fingerprint pattern to an application are introduced.

In some embodiments, provided is a method for a fingerprint sensing driver (or chip) to provide a pre-scanned fingerprint pattern to an application (e.g., a program executed by an application processor), including the following:

(S10) performing a plurality of exposure cycles; and
(S20) outputting the pre-scanned fingerprint pattern to a memory after at least one of the exposure cycles and before the last one of the exposure cycles.

In an embodiment, the method may further include: informing the application to fetch the pre-scanned fingerprint pattern from the memory.

In an embodiment, the method may further include: output a final fingerprint pattern after the last one of the exposure cycles.

In an embodiment, the exposure cycle includes: reset, exposure, and SMP (sample).

In an embodiment, the informing step includes: sending an interrupt to the application.

In an embodiment, the pre-scanned fingerprint pattern includes light measurement brightness average information.

In an embodiment, the pre-scanned fingerprint pattern includes a truncated fingerprint image obtained by the exposure cycle.

In an embodiment, the memory is within the fingerprint driver (or chip).

In some embodiments, after performing a second exposure cycle to obtain a second pre-scanned fingerprint pattern, the second pattern may be averaged with the first pattern, or replacing the first pattern directly.

The following examples, embodiments, or description are related to the method for a fingerprint sensing driver (or chip) to provide a pre-scanned fingerprint pattern to an application.

A pre-scan fingerprint data pattern or data set generated by an image pre-scan process carried out in the course of optical fingerprint recognition in a fingerprint sensing driver or chip (mounted, for example, on a computation device (such as a smart device)) is described below, illustrated by an embodiment, and provided in advance to an application of a processor of the computation device (such as a smart device) in communicative connection with the fingerprint sensing driver. The application uses the pre-scan fingerprint data pattern or data set to perform earlier a fingerprint recognition function, such as an algorithm for a disabling function. Therefore, the performance of a large-screen fingerprint recognition function (for example, disabling function) can be enhanced greatly.

The basic framework and principle of optical fingerprint recognition are described below. After receiving from a host an instruction of fingerprint capturing, the fingerprint sensing driver or chip carries out reset, exposure, data sampling and data capturing sequentially. When it comes to optical fingerprint recognition and fingerprint capturing, prior art discloses fetching multiple fingerprint images and averaging them, so as to reduce interference of the fingerprint images from noise and thus reduce recognition rate.

To obtain the best final fingerprint images and thereby cope with noise by multi-cycle plane averaging, it is necessary to wait for the completion of all the cycles of the predetermined number, and the waiting time is expressed by the equation below.

(the predetermined cycle number)*total time of (finalizing a frame entails reset, exposure and then sampling captured data)

In an embodiment, during the multi-cycle data capturing process, not only are final fingerprint images of the plane average captured at the end of multiple cycles, but the image information of each cycle is also provided to the application (for executing a corresponding algorithm) at the end of the cycle to perform a pre-scan process (also known as pre-scan image process).

For instance, the contents provided to the application (for executing a corresponding algorithm) to perform pre-scan pre-processing include image information, entire frame light measurement brightness average information or other information.

For example, referring to FIG. 1A, assuming that the scan cycle number in this embodiment is four (for example, Cycle1 through Cycle4 shown in FIG. 1A), data output (depicted by the block which contains FAI data output in FIG. 1A) of the final average image (FAI for short) is not carried out until the completion of the fourth cycle (for example, Cycle4) so as for the data to be read by an application and then compared by the application (for executing a corresponding algorithm). As shown in FIG. 1A, the block of an algorithm process depicts the processing process of an application, and the block which includes R depicts the timing of reset. The exposure block depicts the timing of exposure, and the ensuing block which includes S depicts the timing of sampling. Referring to FIG. 1A, blocks arranged on the same row to depict sessions of reset, exposure, and sampling which are contiguous with each other depict the aforesaid reset, exposure, and sampling which are performed on fingerprint sensing elements along a specific row. However, the aforesaid example is not restrictive of implementation of the present disclosure.

To obtain the best final fingerprint images and thereby cope with noise by multi-cycle plane averaging, it is necessary to wait for the completion of all the cycles of the predetermined number, and the waiting time is expressed by the equation below.

(the predetermined cycle number)*total time of (finalizing a frame entails reset, exposure and then sampling captured data)

Figure 1B:
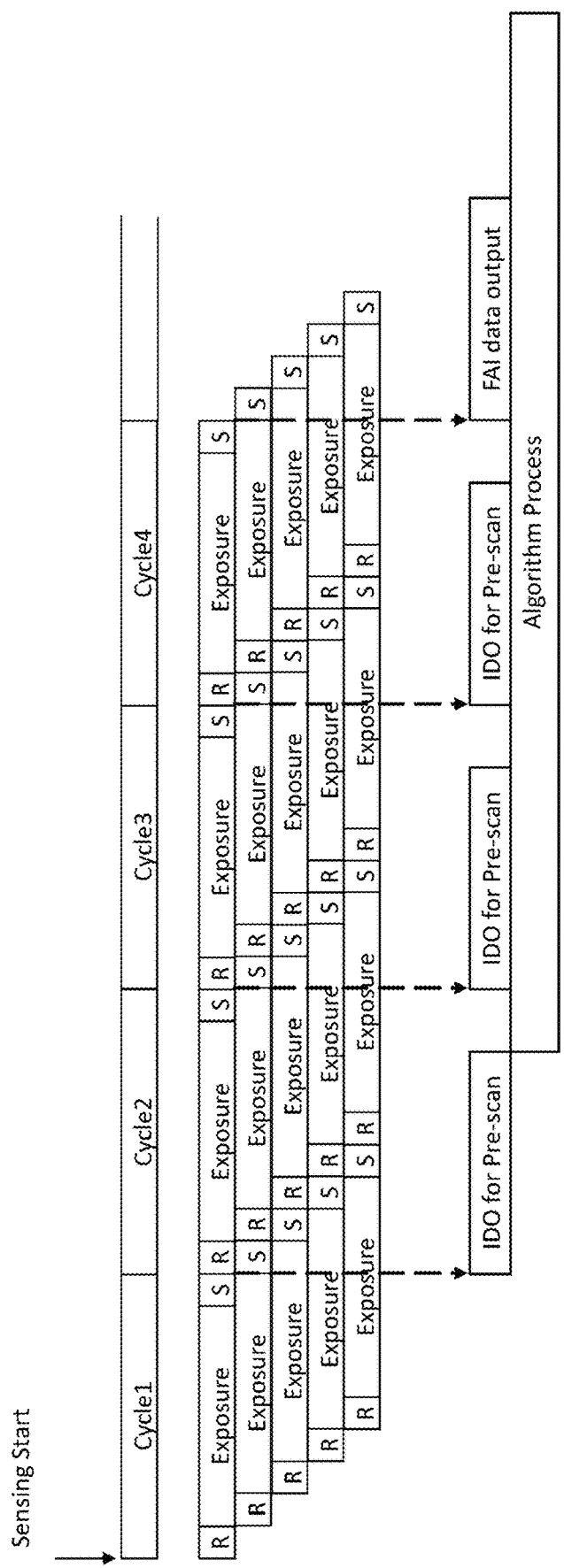
FIG. 1B schematically shows that fingerprint images in each cycle of a pre-scan image process are captured and provided for use by an application (for executing a corresponding algorithm) according to an embodiment of the present disclosure.

In an embodiment illustrated by FIG. 1B, during the multi-cycle data capturing process, not only are final fingerprint images of the plane average captured at the end of multiple cycles, but the image information (in the form of IDO (image data output) shown in FIG. 1B) of each cycle is also provided to the application (for executing a corresponding algorithm) at the end of the cycle to perform a pre-scan process (also known as pre-scan image process). For instance, the contents provided to the application (for executing a corresponding algorithm) to perform pre-scan pre-processing include image information, entire frame light measurement brightness average information or other information. As shown in FIG. 1B, the block of Algorithm Process depicts that execution of the application occurs upon completion of Cycle1.

Conventional optical fingerprint recognition is integrated into Touch/Driver to form one IC known as "fingerprint, display, touch IC (FDTI or FTDI)".

Figure 1C:
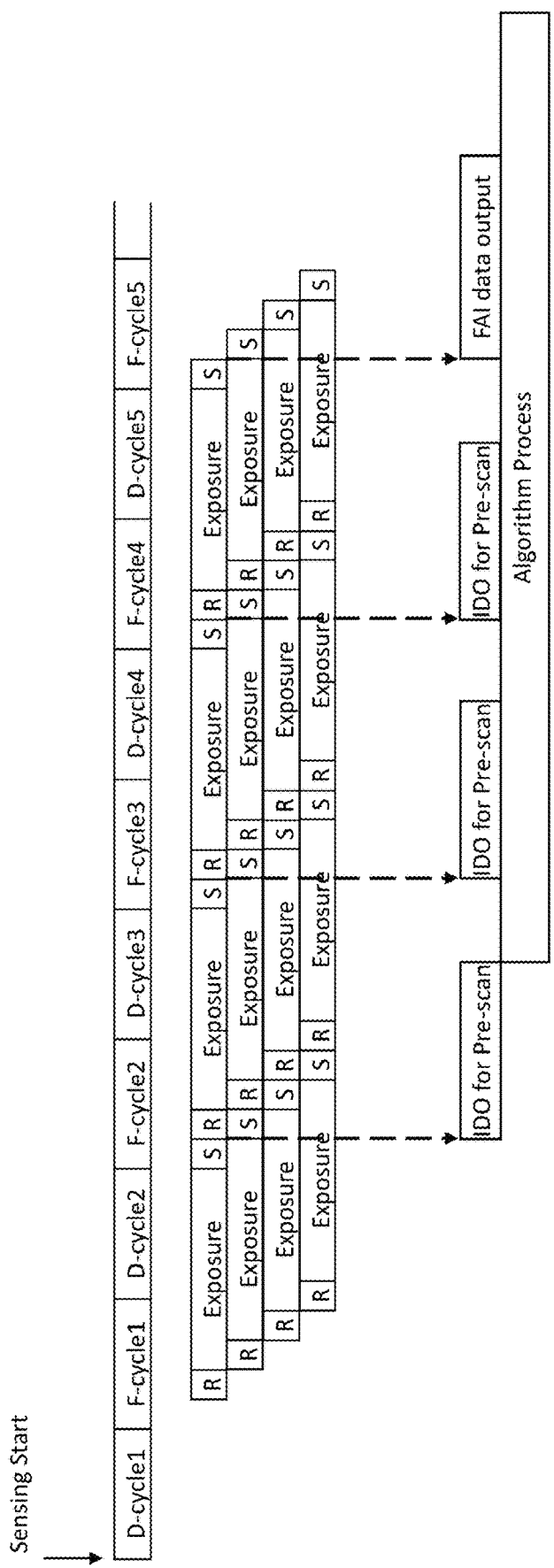
FIG. 1C schematically shows a pre-scan image process applied to FTDI application according to an embodiment (fast version) of the present disclosure.

In an embodiment illustrated by FIG. 1C, a diagram of the time sequence of the operation taking place in one single IC of FTDI, given the FTDI application, fingerprint recognition takes place in finger-cycles (for example, F-cycle1, F-cycle2, . . . F-cycle5) shown in the diagram. In this embodiment, starting from finger-cycle2, pre-scanned image data (as shown in FIG. 1C, IDO for Pre-scanned block represents the session required to output data) is provided to an application (for executing a corresponding algorithm) in order to undergo pre-comparison. As shown in FIG. 1C, the block of Algorithm Process depicts that execution of the application occurs upon completion of F-Cycle2. Referring to FIG. 1C, D-cycle1 denotes Display-cycle, whereas D-cycle and F-cycle alternate, indicating that display and fingerprint-related operation take place at different sessions of the time sequence inside one single IC of FTDI; for example, the interface of one single IC displays the time sequence used by fingerprint-related data. However, the aforesaid example is not restrictive of implementation of the present disclosure. A variant embodiment illustrated by FIG. 1C or related to outputting fingerprint-related data earlier is configured to be not limited by examples of the aforesaid display cycle.

Take conventional display frequency of 60 Hz as an example, the duration of each cycle is 16.6 ms, and transfer period time of image data out is:

Interface transfer period time*Panel $X$ size*Panel $Y$ size*bits number per pixel Given a fingerprint recognition application displayed on a large screen, an increase of X/Y size inevitably causes the prolongation of the transfer period time and thus affects the working range of the next finger-cycle, i.e., greater than 16.6 ms*2=33.2 ms. Given the application, to achieve pre-scanning, bit number per pixel to be transferred is processed. In this embodiment, assuming that the initially transferred bit number per pixel is 12 bits, given a large screen application, to prevent the prolongation of the transfer period time, truncated pixel information, for example, 8 bits, 10 bits or any other appropriate bit number, is transferred, so as to implement the pre-scan image process. In this embodiment (fast version), the efficiency of processing can be enhanced.

Figure 1D:
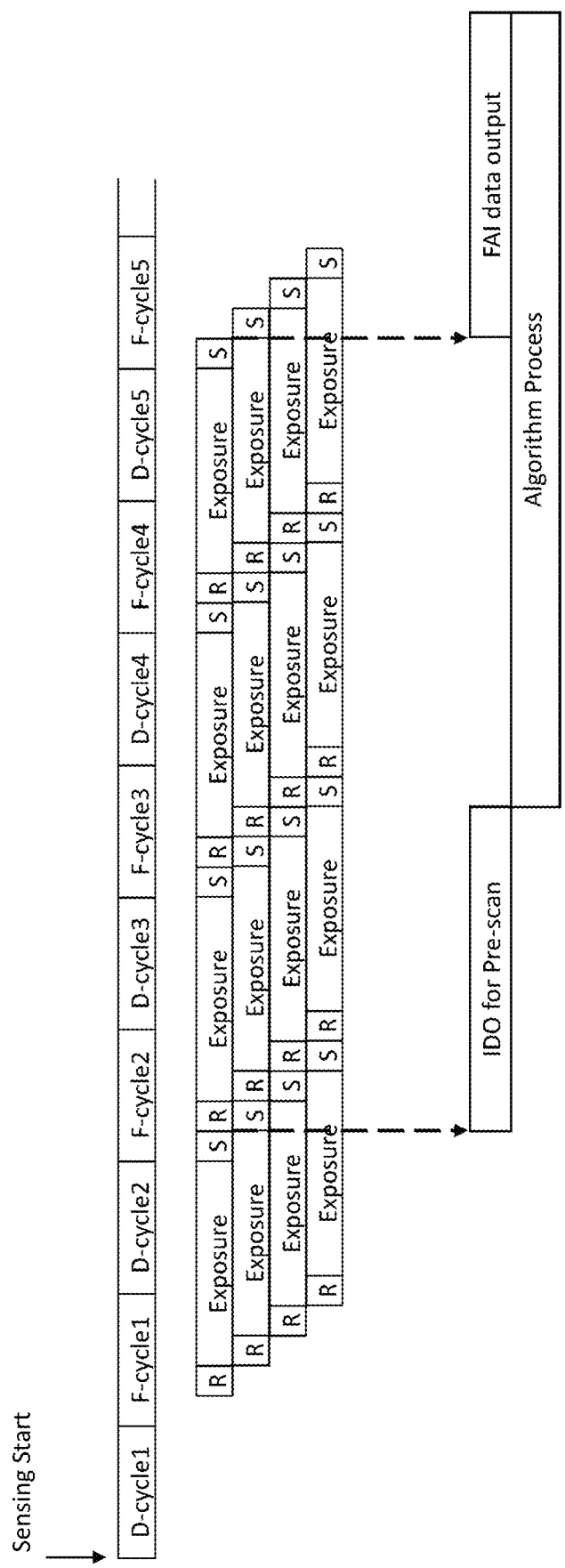
FIG. 1D schematically shows a pre-scan image process applied to FTDI application according to another embodiment (no-truncate version) of the present disclosure.

In another embodiment, initial pixel image-related data which has not yet been truncated (for example, 12 bits initially) is transferred to an application (for executing a corresponding algorithm) for processing. As shown in FIG. 1D, compared with data bit number reduction (for example, 8 or 10 bits) in FIG. 1C, the transfer period time is prolonged, because the transferred bits number per pixel is the initial bit number (for example, 12 bits), and thus the time of the next finger-cycle interface capturing is affected, thereby leading to a conflict between interface transfer and interface control right. As shown in FIG. 1D, the period time of the transfer of the image data in finger-cycle1 is already greater than 33.2 ms and thus affects image data readout in finger-cycle2. Regarding the application, to preclude any conflict between finger-cycle3 and finger-cycle4, this embodiment (no-truncate version) entails providing pre-scan image data (12 bits) of finger-cycle1 to an application (for executing a corresponding algorithm) for processing. In this embodiment, to preclude any interface-related conflict, data of finger-cycle2/finger-cycle3 is not provided, and finally the final average image is provided to the application (for executing a corresponding algorithm).

Regarding the effect of the aforesaid embodiments, the processing process taking place in multiple cycles enables the application (for executing a corresponding algorithm) to execute a corresponding algorithm, for example, a fingerprint comparison and determination process, in accordance with pre-scan information provided by at least one cycle. If the application determines that the result of comparison is affirmative, the comparison process will end instantly, so as to save disabling time and enhance user experience speed. The application (for executing a corresponding algorithm) need not wait for the completion of the predetermined number of multiple cycles in order to effectuate comparison, thereby precluding a waste of time. Therefore, the present disclosure enhances overall efficiency and enables better user experience.

Secondly, systems, devices, and methods for adjustment of slew rate of signals for a fingerprint sensing driver or FDTI chip are introduced.

In some embodiments, an apparatus capable of facilitating charge injection reduction with respect to a fingerprint sensor, the apparatus used to be coupled to a fingerprint sensor having a plurality of fingerprint sensing elements associated with a display panel, the apparatus comprising:

a signal generator circuit for generating a reset signal with a falling edge that is configurable; and a fingerprint sensing control circuit, coupled to the fingerprint sensor, for selectively facilitating the signal generator circuit to output the reset signal to at least one portion of the fingerprint sensing elements of the fingerprint sensor while the fingerprint sensing control circuit outputs a clock signal to the fingerprint sensor so as to reset the portion of the fingerprint sensing elements respectively in a reset stage for the fingerprint sensor, wherein the signal generator circuit is operable to configure the reset signal having the falling edge with a slew rate less than that of the clock signal so as to reduce charge injection in the fingerprint sensing elements that have been reset.

In some embodiments, the signal generator circuit is operable to configure the reset signal having the falling edge that includes a segment and falls in a piecewise manner substantially.

In some embodiments, the signal generator circuit is operable to configure the reset signal having the falling edge that includes a plurality of down-sloping segments and falls in a piecewise manner substantially.

In some embodiments, the signal generator circuit is operable to configure the reset signal having the falling edge that includes a plurality of steps and falls in a stepwise manner substantially.

In some embodiments, the signal generator circuit is operable to configure the reset signal having the falling edge that includes at least one step and at least one segment and falls in a piecewise manner substantially.

In some embodiments, the signal generator circuit includes:

a first inverter having an input end for receiving a pulse signal and an output end, wherein the first inverter is powered by a current source when the pulse signal falls from a high voltage level to a low voltage level; and a second inverter having an input end coupled to the output end of the first inverter and having an output end for outputting the reset signal, wherein the input and output ends of the second inverter are coupled capacitively.

In some embodiments, the signal generator circuit includes:

a first inverter having an input end for receiving a pulse signal and an output end, wherein the first inverter is powered by a plurality of current sources sequentially when the pulse signal falls from a high voltage level to a low voltage level; and a second inverter having an input end coupled to the output end of the first inverter and having an output end for outputting the reset signal, wherein the input and output ends of the second inverter are coupled capacitively.

In some embodiments, the apparatus is implemented in a single chip and the signal generator circuit is disposed in the apparatus.

In some embodiments, the apparatus is implemented in a single chip and the signal generator circuit is disposed externally to the apparatus.

In some embodiments, a computing apparatus is provided, comprising:

a display panel with a touch sensor and a fingerprint sensor;

a signal generator circuit for generating a reset signal with a falling edge that is configurable (as exemplified in one of the above embodiments or combination thereof, whenever appropriate); and a fingerprint sensing control circuit coupled to the fingerprint sensor (as exemplified in one of the above embodiments or combination thereof, whenever appropriate).

A mechanism for signal slew rate adjustment in a fingerprint sensing driver or chip (mounted, for example, on a computation device (such as a smart device)) is described below.

Figure 2A:
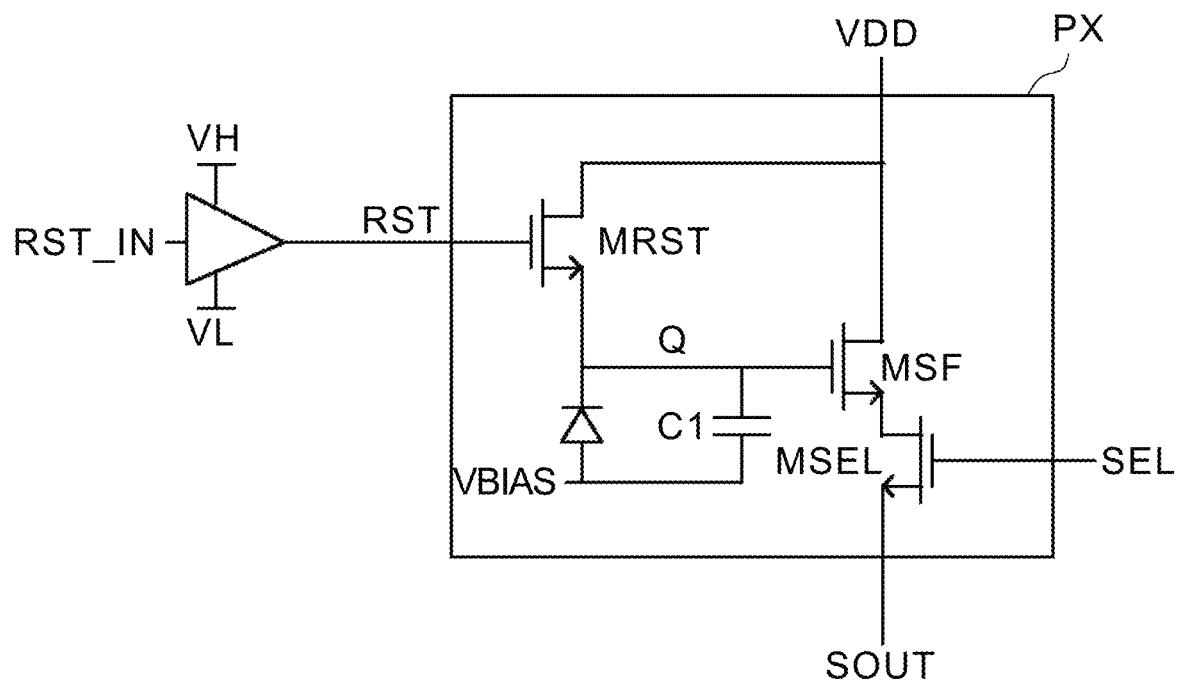
FIG. 2A schematically shows pixel reset switch charge injection in a pixel circuit.
Figure 2B:
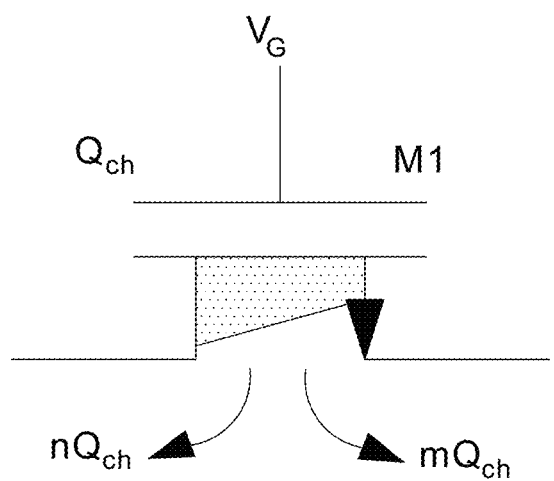
FIG. 2B schematically shows charge injection.

Before further providing embodiments of the second aspect of the disclosure, an issue of charge injection of a pixel reset switch in a pixel circuit is discussed. FIG. 2A schematically shows pixel reset switch charge injection in a pixel circuit. FIG. 2B schematically shows charge injection. An optical fingerprint reading circuit must undergo exposure by a pixel circuit in order to obtain fingerprint images. In FIG. 2A, a pixel circuit PX is shown for a pixel and includes a reset switch (e.g., indicated by MRST), a photodiode, a capacitor C1, and additional switches (e.g., indicated by MSF, MSEL) for selection of the pixel. In addition, RST_IN indicates an input reset signal, RST indicates a reset signal output by a buffer, VBIAS indicates a signal for biasing, SEL indicates a signal for selection of the pixel, and SOUT indicates an output signal of the pixel. A fingerprint sensor, for example, may include a plurality of fingerprint sensing elements, in an array or matrix form, wherein each fingerprint sensing element can be based on the pixel circuit PX. Regarding the MRST switch in the pixel, the voltage of point (i.e., node) Q after reset is affected by charge injection generated as a result of RST signal falling.

The reset process entails resetting point Q to VDD. However, as soon as the MRST switch is turned off, channel electrons (e.g. indicated by $Q_{ch}$) on the MRST switch (e.g., indicated by M1 in FIG. 2B) are released (e.g., a portion of $Q_{ch}$ such as $mQ_{ch}$ or $nQ_{ch}$) to point Q to cause charge injection and thereby voltage drop at point Q.

$$V_{injection} = -\frac{C_{ov}}{C_1}(VH - VL)$$

The aforesaid effect decreases as a result of a decrease in the speed of the voltage drop of the MRST switch, as expressed by the equation below.

$$V_{injection} = -\frac{C_{ov}}{C_1}(V_{TH} - VL)$$

Figure 2C:
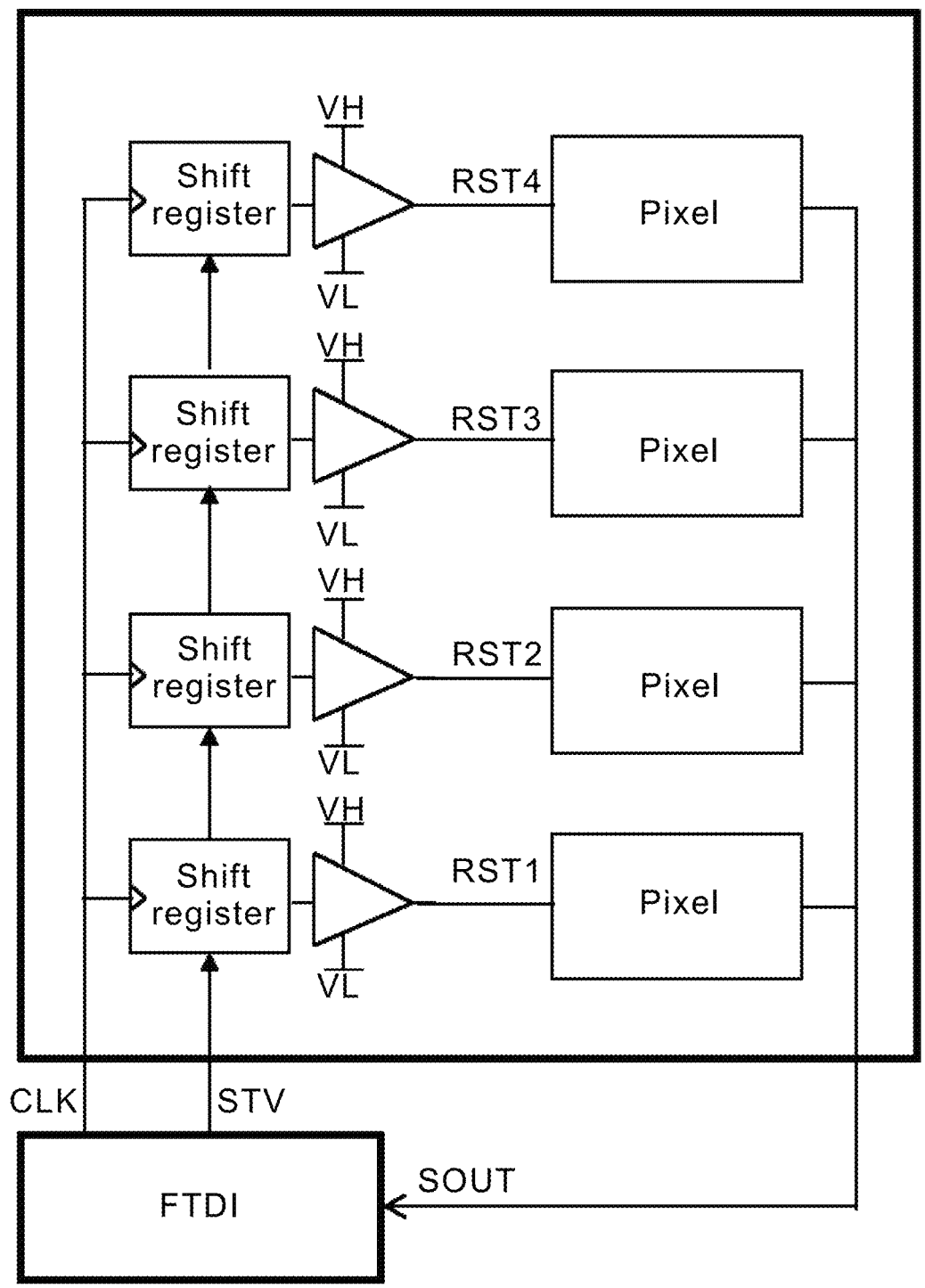
FIG. 2C schematically shows a control method for a preceding panel reset signal.

FIG. 2C schematically shows a control method for a preceding panel reset signal. Slew rate control of reset control signals cannot be carried out to conventional panels, because conventional panels use shift registers to control signal generation at each row. After the shift registers have generated RST pulses, RST voltage level (e.g., voltage levels of RST pulses, RST1-RST4) of pixels is inferred with VH, VL.

Under this condition, if buffer speed is rendered quick, the fall time will be extremely short; thus, charge injection is severe. If buffer speed is overly low, all the pixels of each row on the panel differ in fall time and thus differ in the degree of charge injection to thereby be reset to different voltage levels, thereby generating noise toward the images.

Therefore, drawbacks of the prior art are as follows: the slew rate of a reset switch cannot be controlled, and thus the buffer speed is high, thereby rendering the effect of charge injection severe and impossible to control.

Accordingly, the second aspect of the disclosure provides following embodiments.

In some embodiments, an electronic module comprises:

a slew rate configuring circuit to generate and transmit at least one output signal to a gate on array (GOA) circuit of a panel; and a fingerprint sensing control circuit, coupled to a plurality of fingerprint sensing elements of the panel, to generate and transmit a plurality of control signals to the GOA circuit, wherein the fingerprint sensing control circuit controls the GOA circuit to generate a plurality of reset signals according to at least one output signal and the slew rate configuring circuit controls a slew rate of a falling edge of each of the reset signals, the GOA circuit resets the fingerprint sensing elements respectively.

In some embodiments, a computing apparatus comprises:

a panel comprising a gate on array (GOA) circuit and a plurality of fingerprint sensing elements;

a slew rate configuring circuit to generate and transmit at least one output signal to the GOA circuit; and a fingerprint sensing control circuit, coupled to the fingerprint sensing elements, to generate and transmit a plurality of control signals to the GOA circuit, wherein the fingerprint sensing control circuit controls the GOA circuit to generate a plurality of reset signals according to at least one output signal, the slew rate configuring circuit controls a slew rate of a falling edge of each of the reset signals, and the GOA circuit resets the fingerprint sensing elements respectively.

In some embodiments, a panel comprises:

a panel body;

a gate on array (GOA) circuit disposed on the panel body; and a plurality of fingerprint sensing elements disposed on the panel body and coupled to the GOA circuit;

wherein the GOA circuit is further configured to receive a plurality of control signals provided by a fingerprint sensing control circuit, wherein the control signals are provided for controlling the GOA circuit to generate a plurality of reset signals according to at least one output signal provided by a slew rate configuring circuit, and the GOA circuit resets the fingerprint sensing elements respectively, wherein a slew rate of a falling edge of each of the reset signals is capable of being configured by the slew rate configuring circuit.

In a scenario, an electronic module, for example, a fingerprint touch display integration (FTDI or FDTI) IC is coupled to a panel of a computing apparatus and to drive the panel which is capable of fingerprint sensing over a portion of the screen or whole screen of the panel of the computing apparatus (such as smart phones, tablet computers or other information processing devices). The shutdown speed of a pulse signal is controlled with the IC of FTDI according to multiple embodiments of the present disclosure, such that the pulse signal is sent to the panel to control the RST switch. For example, a constant slew rate pulse generated by the IC end (i.e., IC side such as FTDI IC) is provided to the panel to render the falling time/rise time of the RST switch appropriate (for example, not too fast), thereby slowing down the charge injection effect on the pixels when reset. Furthermore, the shutdown speed of the RST switch is placed under control, such that the charge injection effect remains the same and does not change with the fall time/rise time of the buffer. Therefore, the occurrence of charge injection is inhibited by controlling the shutdown speed of the reset switch.

Figure 2D:
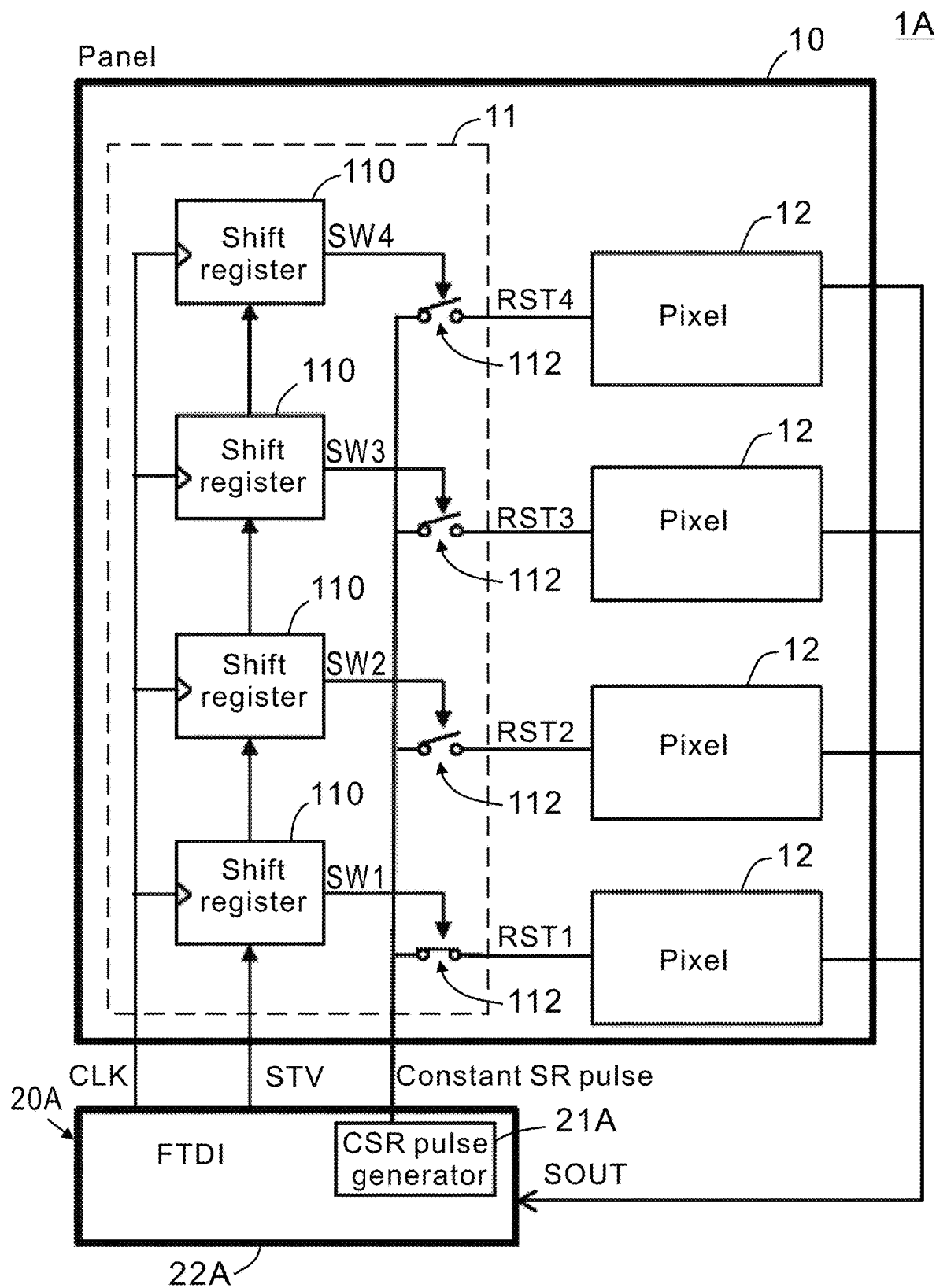
FIG. 2D schematically shows an FTDI constant slew rate pulse mechanism according to an embodiment of the present disclosure.

FIG. 2D schematically shows an FTDI constant slew rate pulse mechanism according to an embodiment of the present disclosure. As shown in FIG. 2D, a computing apparatus 1A (such as smart phones, tablet computers or other information processing devices) comprises a panel 10, a slew rate configuring circuit (e.g., a constant slew rate pulse generator 21A), and a fingerprint sensing control circuit (e.g., an FTDI IC 22A). The slew rate configuring circuit and the fingerprint sensing control circuit can be implemented and included in an electronic module, such as a single chip (e.g., an FTDI IC; or any single chip including fingerprint sensing control functionality or fingerprint driver circuit). The panel 10 comprises a gate on array (GOA) circuit 11 and a plurality of fingerprint sensing elements 12, wherein each fingerprint sensing element, for example, is an optical fingerprint sensing element based on the pixel circuit PX in FIG. 2A. The slew rate configuring circuit (e.g., 21A) is used to generate and transmit at least one output signal (e.g., a constant slew rate pulse) to the GOA circuit 11. The fingerprint sensing control circuit (e.g., 22A), coupled to the fingerprint sensing elements 12, is used to generate and transmit a plurality of control signals (e.g., a clock signal (CLK) and/or a start signal (STV)) to the GOA circuit 11. The fingerprint sensing control circuit (e.g., 22A) controls the GOA circuit 11 to generate a plurality of reset signals (e.g., RST1, RST2, RST3, RST4) according to the at least one output signal. The slew rate configuring circuit (e.g., 21A) controls a slew rate of a falling edge of each of the reset signals (such RST1-RST4), and the GOA circuit 11 resets the fingerprint sensing elements 12 respectively.

In FIG. 2D, the GOA circuit 11, for example, comprises a plurality of shift registers 110 and a plurality of switches 112 (e.g., transfer gates). Each of the shift registers 110 is configured to receive at least a corresponding one of the control signals (such as the CLK signal and STV signal) and is coupled to a corresponding one of the switches 112 to generate a corresponding one of the reset signals (e.g., RST1-RST4) according to the at least one output signal (e.g., a constant slew rate (SR) pulse). In an example as shown in FIG. 2D, the shift registers 110 output a plurality of switch control signals (e.g., SW1, SW2, SW3, SW4) to the switches 112 to generate the respective reset signals (e.g., RST1-RST4).

In an example, the switches 112 (e.g., transfer gate) to which the shift registers 110 of the panel 10 output the switch control signals (e.g., SW1-SW4) are used to respectively control the pixels 12 and are turned on at different time. The signals of the transfer gate are provided by a constant slew rate pulse generator 21A on the FTDI, such that constant slew rate pulse is turned on at the points in time of each row, inputting pulse to each pixel for resetting. With the falling time being controlled, the charge injection effect of each pixel not only slows down but also tends to be identical.

Figure 2E:
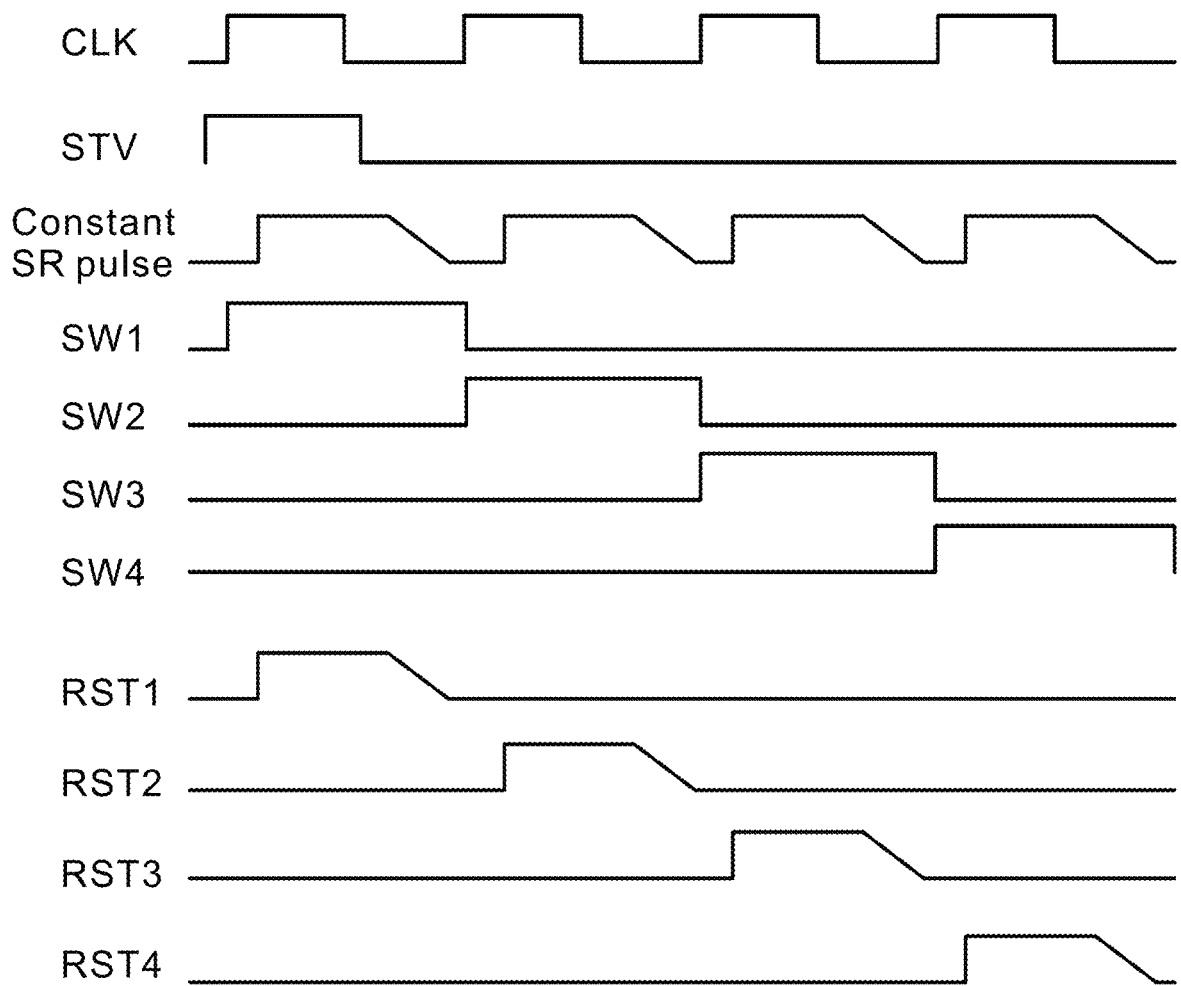
FIG. 2E schematically shows an example of the time sequence of the FTDI constant slew rate pulse mechanism.

In an embodiment, the time sequence of the FTDI constant slew rate pulse mechanism is provided. Given the circuit framework illustrated by FIG. 2D, FIG. 2E schematically shows an example of the time sequence of the FTDI constant slew rate pulse mechanism. From the perspective of clock, a clock signal (CLK) generates and sends clocks to the shift registers 110, and the start signal (STV) generates an initial pulse. In response to CLK pulses, the switches 112 corresponding to the switch control signals SW1, SW2, SW3, SW4 start sequentially.

In response to the timing of CLK, the CSR Pulse generator 21A generates a fixed falling time pulse. Under the control of the shift registers 110, the pulses (e.g., RST1-RST4) are sequentially input to the pixels 112 to control their reset, so as to allow the reset switch (e.g., reset MOS) to turn off slowly and reduce the chance of charge injection.

In some embodiments, the control signals (e.g., CLK, STV) generated by the fingerprint sensing control circuit (e.g., 20A) comprises a clock signal (e.g., CLK), and the reset signals (e.g., RST1-RST4) are synchronized with the clock signal.

In some embodiments, the slew rate of the falling edge of each of the reset signals (e.g., RST1-RST4) is reduced to be less than a slew rate of a falling edge of the clock signal (e.g., CLK), as illustrated in FIG. 2E.

In some embodiments, the slew rate configuring circuit (e.g., 20A) configures one of the reset signals (e.g., RST1-RST4) having the falling edge that includes a down-sloping segment, as illustrated in FIG. 2E.

The time sequence of the control signals and reset signals or so on, as illustrated in FIG. 2E or the above embodiment, can be applied to other embodiments (such as one of FIG. 2H-2L or combination thereof, or related examples) by way of modifications, whenever appropriate.

Figure 2F:
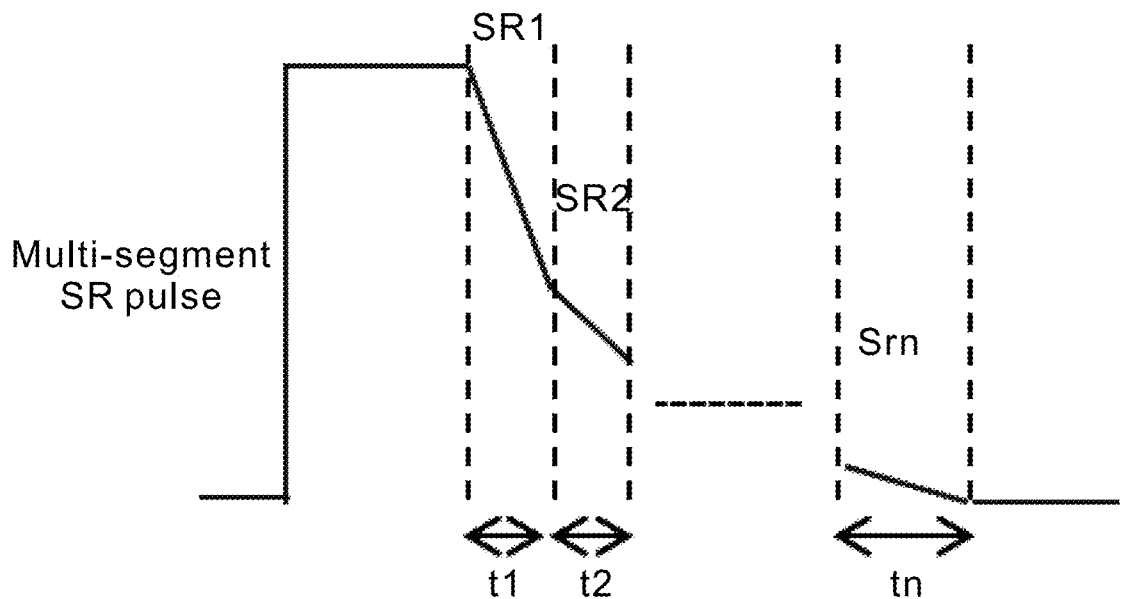
FIG. 2F schematically shows multi-segment slew rate constant slew rate pulse according to an embodiment of the present disclosure.

In some embodiments, the slew rate configuring circuit configures one of reset signals having the falling edge that includes a plurality of down-sloping segments and falls in a piecewise manner, as illustrated in FIG. 2F.

In an embodiment, multi-segment slew rate control is exercised. FIG. 2F schematically shows an embodiment of multi-segment slew rate constant slew rate pulse. The lower the pulse slew rate is, the lesser the charge injection effect is, and the more time the process of voltage conversion takes. The charge injection is most sensitive to the pulse slew rate when it occurs while the shutdown of the switch is approaching; thus, the fall of each pulse can be divided into several phases, such that the slew rate is lower toward the shutdown.

Referring to FIG. 2F, at t1, with the highest slew rate SRL the pulse conversion takes the least time to finish. When the shutdown at to is approaching, the charge injection becomes most sensitive, thereby decreasing the effect of the charge injection with the lowest slew rate SRn.

The following provides various embodiments for implementation of the slew rate configuring circuit.

In some embodiments, the slew rate configuring circuit (e.g., 21A) comprises a pulse generator circuit configured to generate a pulse signal serving as the at least one output signal and provide the pulse signal to the GOA circuit (e.g., 11), wherein the pulse generator circuit is operable to configure the slew rate of the falling edge of each of the reset signals.

Figure 2G:
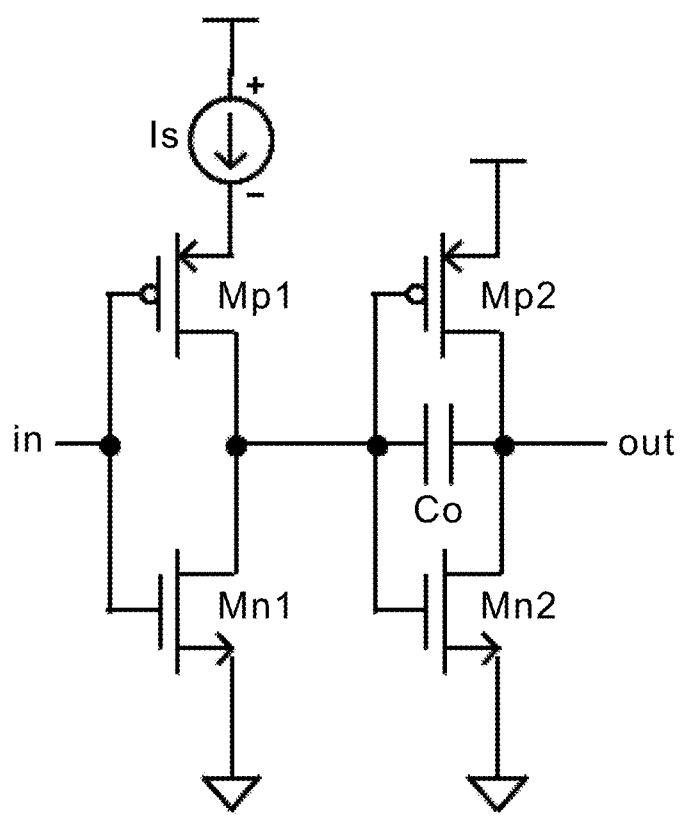
FIG. 2G schematically shows a constant slew rate pulse generator according to an embodiment of the present disclosure.

In an embodiment, a constant slew rate pulse generator is provided as a pulse generator circuit, as illustrated in FIG. 2G. Referring to FIG. 2G, the pulse generator circuit includes a first inverter (e.g., Mp1 and Mn1) and a second inverter (e.g., Mp2 and Mn2). The first inverter includes transistors Mp1 and Mn1, for example, and has an input end (e.g., indicated by a point (or node) "in" in FIG. 2G) for receiving an input signal and an output end, wherein the first inverter is powered by a current source Is. The second inverter includes transistors Mp2 and Mn2, for example, and has an input end coupled to the output end of the first inverter and has an output end (e.g., indicated by a point (or node) "out" in FIG. 2G) for outputting the pulse signal, wherein the input and output ends of the second inverter are coupled capacitively. For example, the input and output ends of the second inverter are coupled through at least one capacitor (e.g., Co).

As shown in FIG. 2G, given a constant SR pulse generator, a fixed current source Is enables the capacitor Co's capacitance voltage to increase at a constant slew rate as soon as the point "in" turns low, so as to control the falling slew rate at point "out", as expressed by the equation SR=Is/Co (i.e., the slew rate of the falling is equal to the current of the current source divided by the capacitance of the capacitor Co). It is because what the current source Is controls is variation in the capacitor Co's electrical charges, and the circuit's slew rate is not susceptible to the influence of a load at the output end indicated by point "out".

When the point "in" changes from low to high in voltage to start the pixel reset switch, the output rise time neither needs to control the slew rate nor limits the current, thereby allowing operation to take place by means of output buffer.

In addition, the slew rate configuring circuit can be implemented to configure one of the reset signals having the falling edge that includes a plurality of down-sloping segments and falls in a piecewise manner.

Figure 2H:
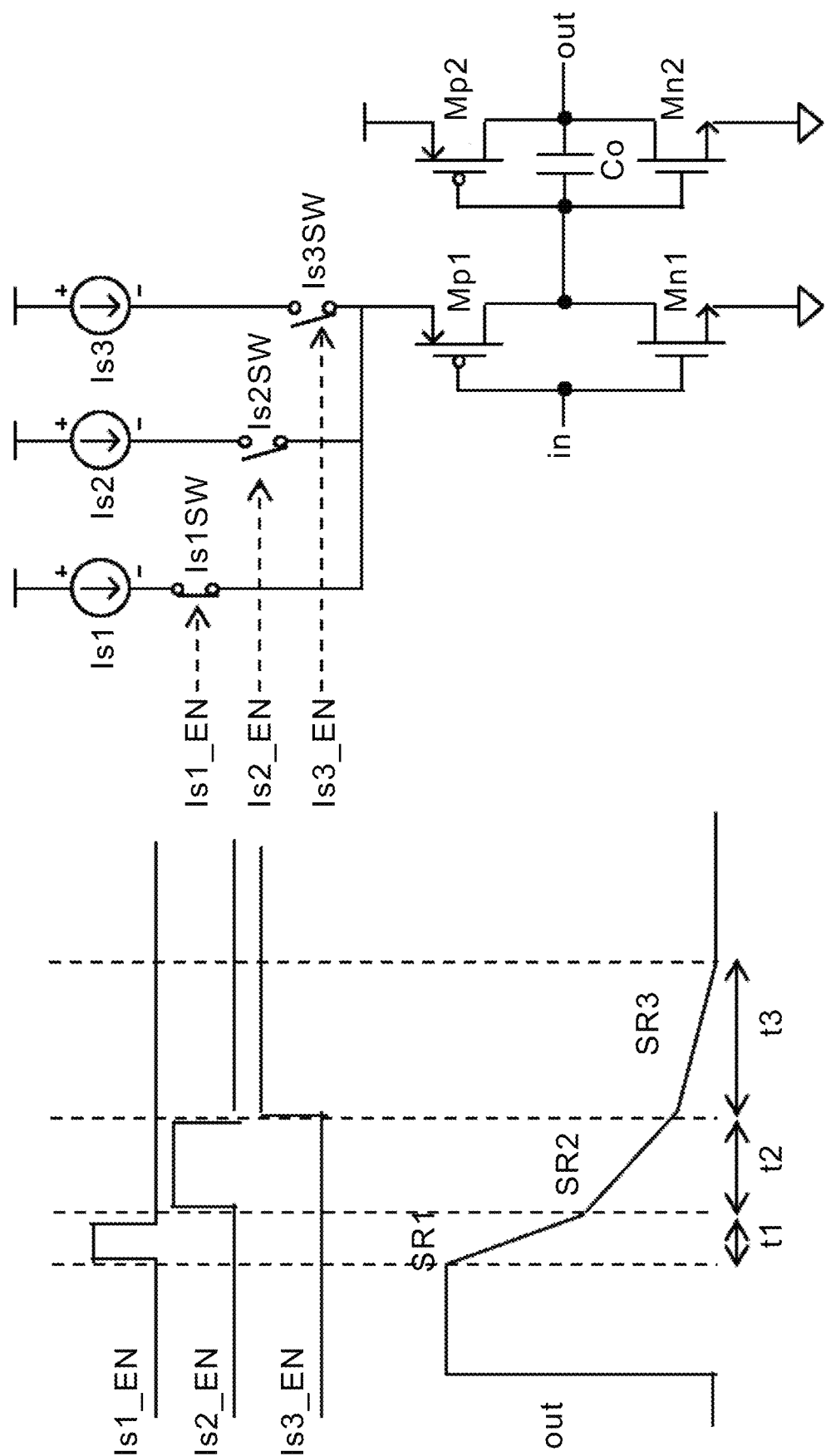
FIG. 2H shows a schematic view of a multi-segment slew rate control pulse generator and a waveform diagram of a corresponding control signal and an output signal.

As shown in FIG. 2H, to control the multi-segment slew rate, current Is varies at a selected time, and current Is increases with the slew rate. In other words, the slew rate configuring circuit can be implemented according to the circuit architecture shown in FIG. 2G with the current source Is replaced by a current source circuit that is capable of outputting a current varying at selected times to the first inverter (e.g., Mp1 and Mn1) to configure the falling edge of a pulse (as illustrated in the left portion of FIG. 2H) at the point (or node) "out" with multiple-segment slew rate. In an embodiment, as illustrated in FIG. 2H, the current source circuit includes a plurality of current sources (e.g., two or more current source, such as Is1, Is2, Is3) and a plurality of switches (e.g., two or more switches, such as Is1SW, Is2SW, Is3SW). As shown in FIG. 2H, for example, switches Is1SW, Is2SW, Is3SW start sequentially to generate falling signals which slow down gradually, given Is1>Is2>Is3 (e.g., the magnitude of currents of the current sources are different). For example, the switches (e.g., Is1SW, Is2SW, Is3SW) sequentially and individually output currents of different magnitude at corresponding time periods (e.g., t1, t2, t3) and the time periods are controlled by a plurality of control signals (e.g., Is1_EN, Is2_EN, Is3_EN). Accordingly, the slew rate configuring circuit that is capable of configuring the falling edge of the pulse with multiple-segment slew rate can be implemented by using the first inverter, the second inverter, and the current source circuit, as illustrated in FIG. 2H. Optionally, the slew rate configuring circuit may include a control circuit for generating the control signals (e.g., Is1_EN, Is2_EN, Is3_EN). The slew rate configuring circuit, as illustrated in FIG. 2H, can substitute for the constant slew rate pulse generator 21A in FIG. 2D.

Figure 2I:
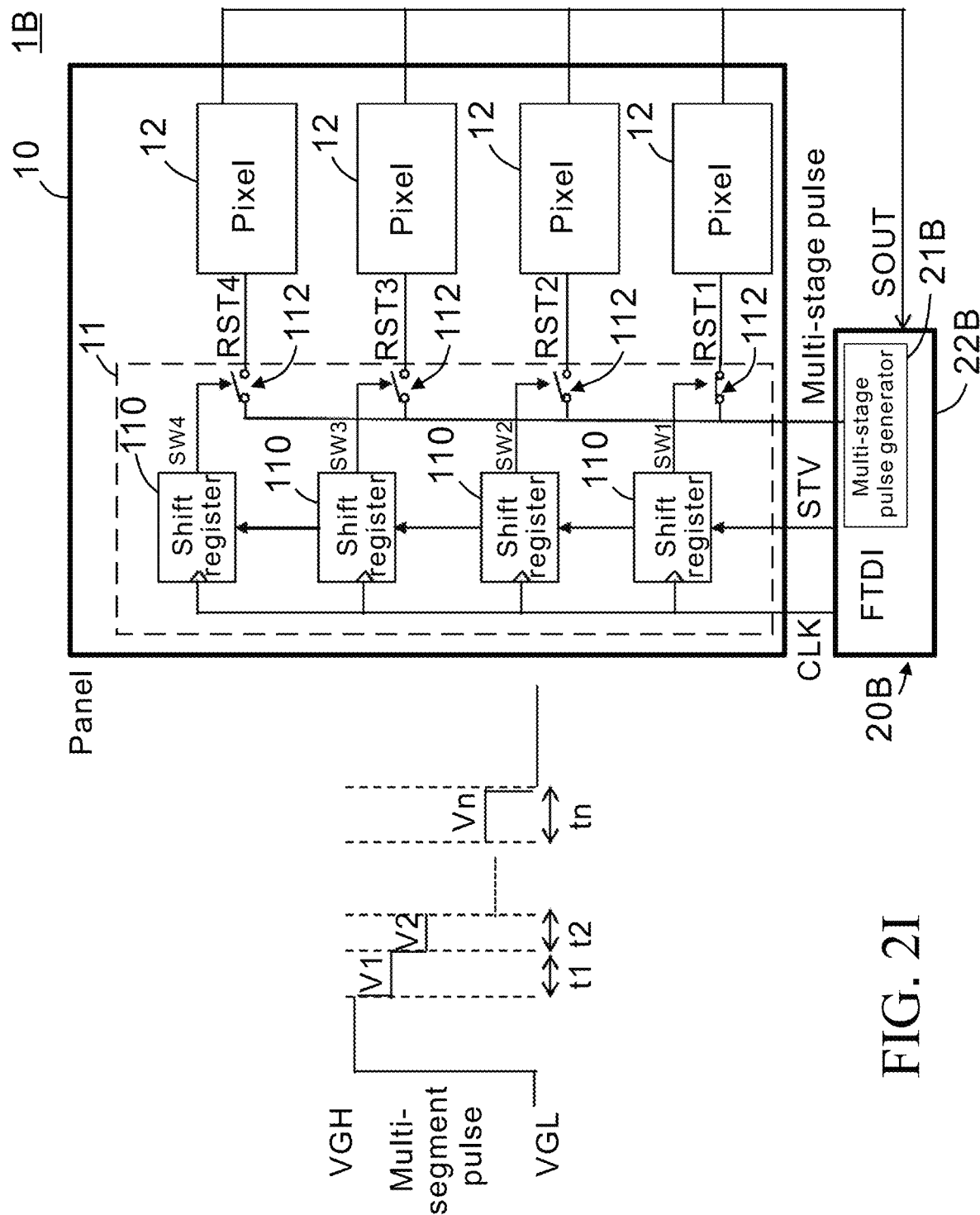
FIG. 2I schematically shows multi-segment discharge pulse control according to an embodiment of the present disclosure.

Further, the slew rate configuring circuit can be implemented to configure one of reset signals having the falling edge that includes at least one step and at least one segment and falls in a piecewise manner (e.g, a multi-segment pulse as illustrated in the left portion of FIG. 2I).

FIG. 2I schematically shows multi-segment discharge pulse control according to an embodiment of the present disclosure. Not only is the rise time/fall time of the panel directly controlled with a constant slew rate circuit, but the chance of charge injection is also reduced by a multi-segment discharging method. As shown in FIG. 2I, in an embodiment, the multi-segment (more than two segments) discharging at the IC end (IC side) slows down the direct fall of VRST (e.g., voltage of reset signals such as RST1-RST4) from VGH to VGL, reduces perceivable instantaneous voltage difference, and reduces the chance of charge injection.

As shown in FIG. 2I, a computer apparatus 1B includes a panel 10 and an electronic module 20B, and the electronic module 20B includes a slew rate configuring circuit (e.g., 21B) and a fingerprint sensing control circuit (e.g., 22B). The computer apparatus 1B differs from the computer apparatus 1A in that the computer apparatus 1B utilizes a slew rate configuring circuit for implementation multi-segment discharge pulse control (e.g., a multi-stage pulse generator 21B) as illustrated in FIG. 2I, instead of the constant slew rate pulse generator 21A. In some embodiments, a multi-stage pulse generator 21B comprises a voltage level generator circuit configured to generate a plurality of output signals with a plurality of predetermined voltage levels (e.g., V1, V2, . . . , Vn, n>1) and provide the plurality of output signals to the GOA circuit such that each of the reset signals transitions based on the predetermined voltage levels during the falling edge. The voltage level generator circuit can be implemented to output a multi-stage pulse with a falling edge having multiple voltage levels (or steps). The voltage level generator circuit, for example, can be implemented by using a selection circuit (such as a multiplexer or a plurality of switches) coupled to a plurality of power sources (such as voltage or current sources) and sequentially selecting some or all of a plurality of voltages (e.g., VGH, V1, V2, . . . , Vn, VGL) generated according to the power sources through the selection circuit at corresponding time periods (e.g., t1, t2, . . . , tn) to output a multi-stage pulse with a falling edge having multiple voltage levels (or voltage steps).

In the above embodiments, the GOA circuit (e.g., 11) of a panel (e.g., 10), as illustrated in FIG. 2D or 2I, is configured to be coupled to the slew rate configuring circuit (e.g., 21A or 21B; FIG. 2G or 2H) and the fingerprint sensing control circuit (e.g., 22A or 22B) that are implemented in a single chip.

Figure 2J:
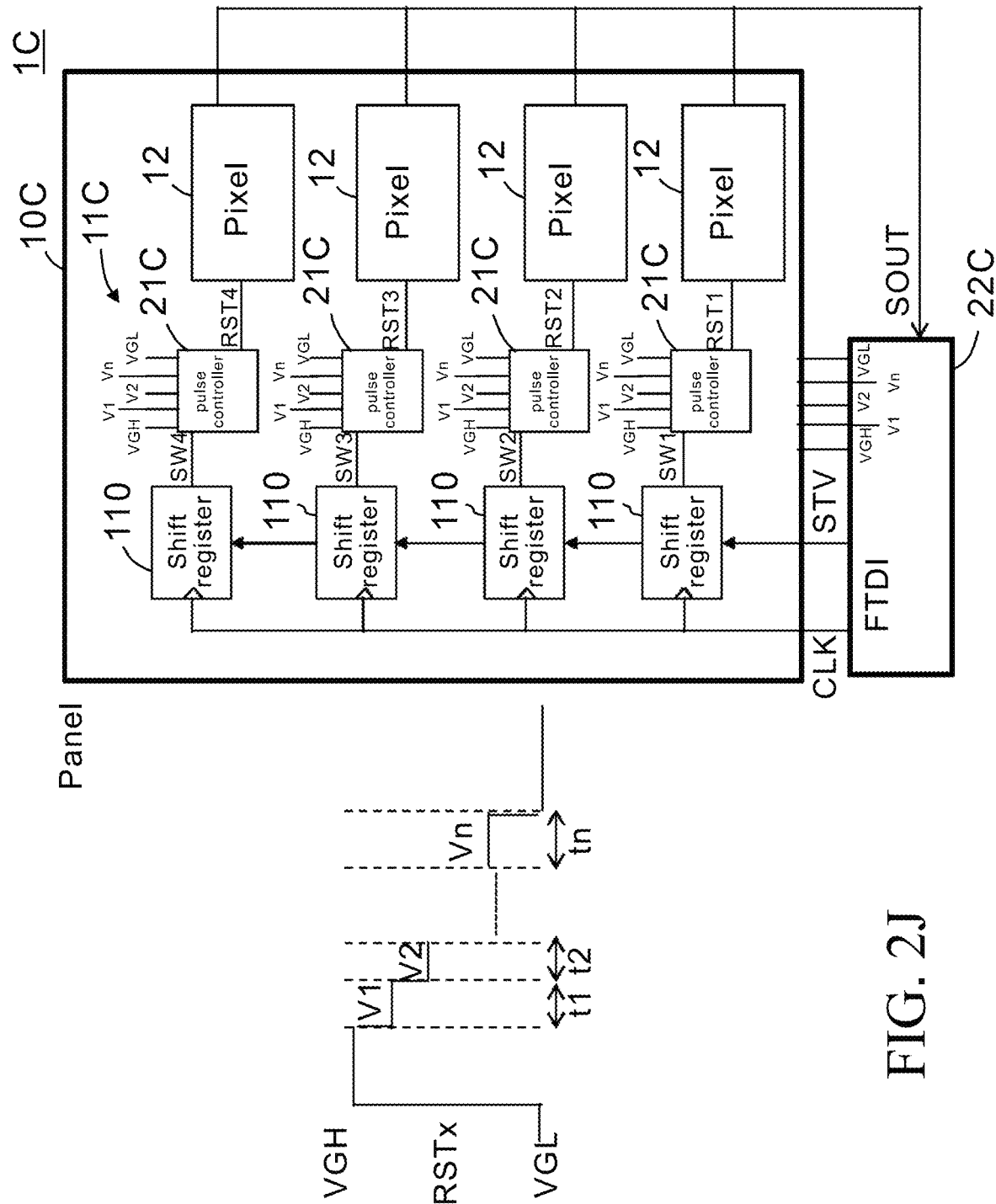
FIG. 2J schematically shows multi-segment discharge pulse control functioning on a panel according to an embodiment of the present disclosure.
Figure 2K:
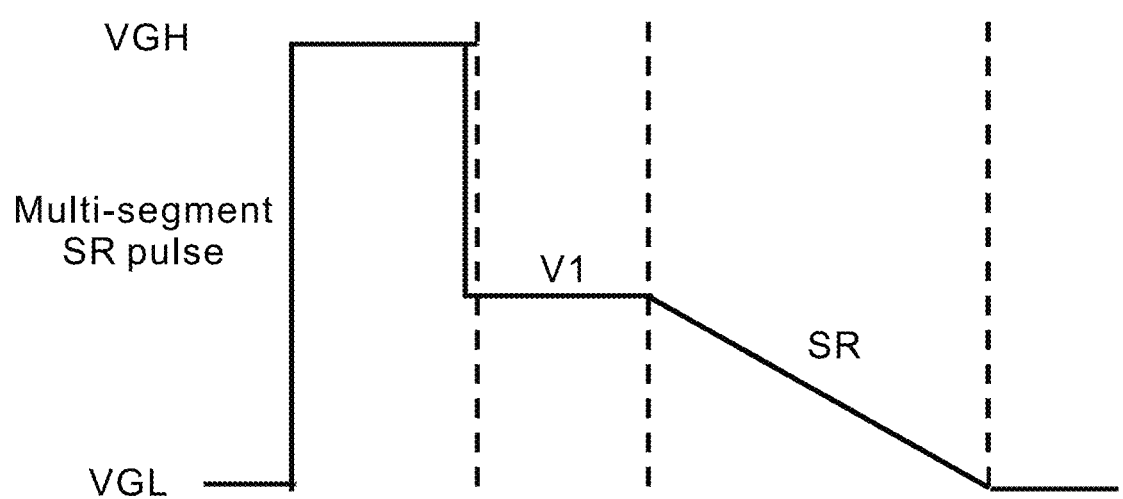
FIG. 2K schematically shows an impedance current limiting pulse generation mechanism according to an embodiment of the present disclosure.
Figure 2L:
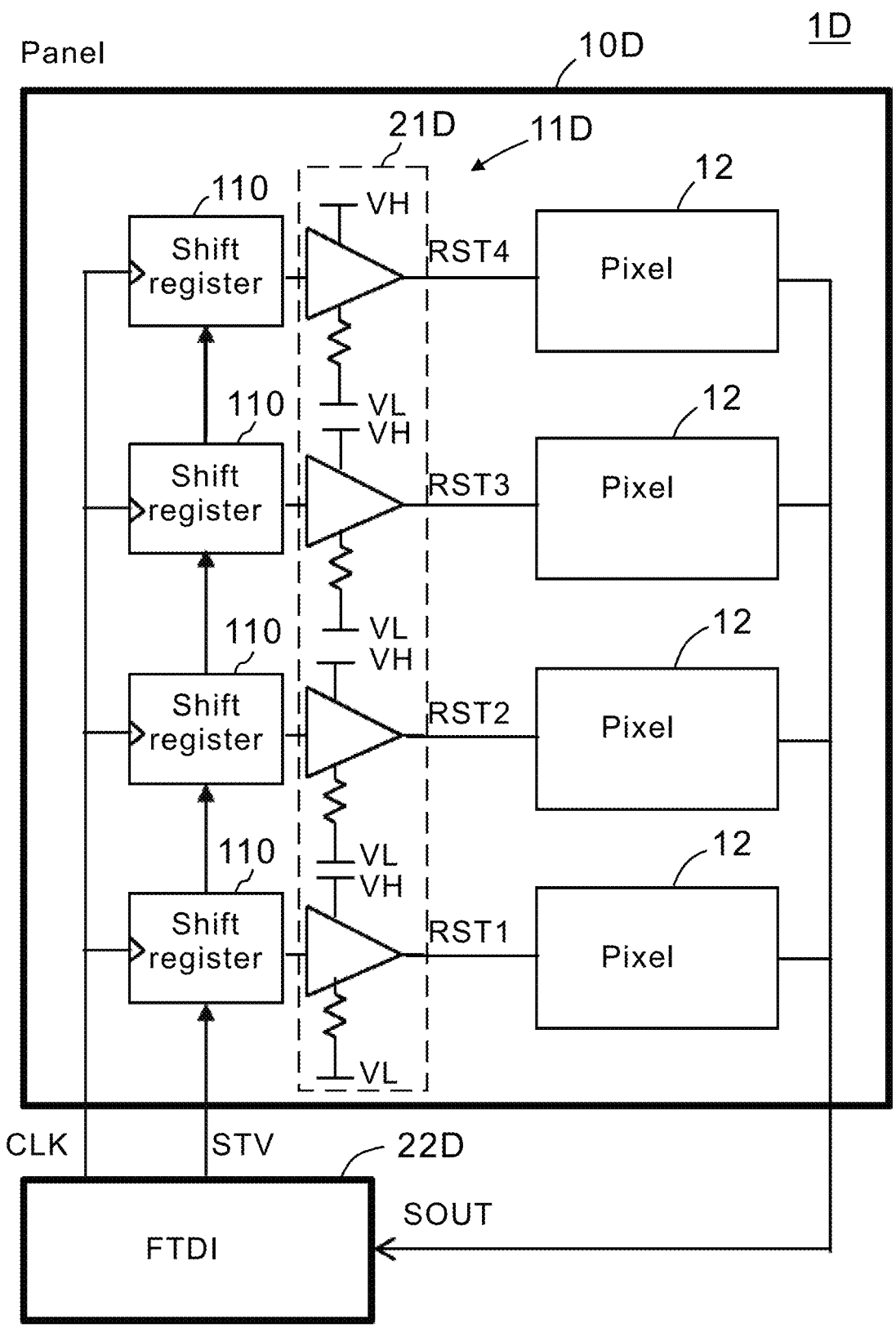
FIG. 2L is a block diagram of the impedance current limiting pulse generation mechanism functioning on a panel according to an embodiment of the present disclosure.

In further embodiments, the GOA circuit (e.g., 11C or 11D) of a panel (e.g., 10C or 10D), as illustrated in FIG. 2J or 2L, is configured to be coupled to a fingerprint sensing control circuit (e.g., 22C or 22D) that is implemented in a single chip and the slew rate configuring circuit (e.g., 21A, 21B, 21C, or 21D; FIG. 2G or 2H) that is disposed externally to the single chip and is on the panel.

As illustrated in FIG. 2J or 2L, a slew rate configuring circuit (e.g., 21C or 21D) can be implemented on a panel (e.g., 1C or 1D). In this way, the slew rate configuring circuit can be regarded to be included in a gate on array (GOA) circuit of the panel, for example. In these embodiments, a panel (e.g., 1C or 1D) comprises a panel body (e.g., the body of 1C or 1D), a gate on array (GOA) circuit (e.g., 11C or 11D) disposed on the panel body, and a plurality of fingerprint sensing elements (e.g., 12) disposed on the panel body and coupled to the GOA circuit. The GOA circuit (e.g., 11C or 11D) is configured to receive a plurality of control signals (e.g., CLK and STV) provided by a fingerprint sensing control circuit (e.g., 22C or 22D), wherein the control signals are provided for controlling the GOA circuit to generate a plurality of reset signals (e.g., RST1-RST4) according to at least one output signal provided by a slew rate configuring circuit (e.g., 21C or 21D), and the GOA circuit (e.g., 11C or 11D) resets the fingerprint sensing elements (e.g., 12) respectively, wherein a slew rate of a falling edge of each of the reset signals is capable of being configured by the slew rate configuring circuit.

In some embodiments, the GOA circuit (e.g., 11C or 11D), as illustrated in FIG. 2J or 2L, comprises a plurality of shift registers 110. Each of the shift registers 110 is configured to receive at least a corresponding one of the control signals (e.g., CLK or STV) and is coupled to the slew rate configuring circuit (e.g., 21C or 21D) to generate the plurality of reset signals (e.g., RST1-RST4) with a plurality of predetermined voltage levels (e.g., VGH, V1, V2, . . . , Vn, VGL, n>1; or VH and VL) such that each of the reset signals transitions based on the predetermined voltage levels during the falling edge. The outputs of the shift registers 110 can be used for enabling or triggering the slew rate configuring circuit (e.g., 21C or 21D) to generate the reset signals (e.g., RST1-RST4), for example, according to a time sequence of control signals and reset signals, as illustrated in or similar to that of FIG. 2E.

FIG. 2J schematically shows multi-segment discharge pulse control functioning on a panel according to an embodiment of the present disclosure. As shown in FIG. 2J, a computer apparatus (e.g., 1C) includes a panel 10C, a slew rate configuring circuit (e.g., 21C) and a fingerprint sensing control circuit (e.g., 22C). The computer apparatus 1C differs from the computer apparatus 1A or 1B in the slew rate configuring circuit (e.g., 21C) is on the panel (e.g., 1C) of the computer apparatus 1C, rather than being implemented in a single chip with the fingerprint sensing control circuit (e.g., 22C or 22D). For example, the slew rate configuring circuit (e.g., 21C) can be a pulse controller implemented according to a voltage level generator circuit (e.g., as exemplified above), and configured to generate a plurality of reset signals according to a plurality of predetermined voltages (e.g., VGH, V1, V2, . . . , Vn, VGL; n>1). As illustrated in FIG. 2J, the fingerprint sensing control circuit (e.g., 22C) can be implemented to output control signals (e.g., CLK and STV) and the plurality of predetermined voltages to a GOA circuit 11C and the pulse controllers 21C, respectively.

As shown in FIG. 2J, with the multi-segment discharging method, not only are pulses directly generated at the IC end, such as a FTDI IC 22C, but multiple voltage levels are also generated at the IC end, thereby allowing different voltage levels to be generated at different points in time by logic-based selection performed on the panel, so as to attain the aforesaid effect: slows down the direct fall of VRST (e.g., voltage of reset signals such as RST1-RST4; or indicated by RSTx; x>1) from VGH to VGL, reduces perceivable instantaneous voltage difference, and reduces the chance of charge injection.

In another embodiment according to FIG. 2J, the plurality of predetermined voltages (e.g., VGH, V1, V2, . . . , Vn, VGL; n>1) can be provided by another circuit (e.g., power circuit), other than the FTDI IC 22C.

Further, the slew rate configuring circuit can be implemented to configure one of reset signals having the falling edge that includes at least one step and at least one segment and falls in a piecewise manner. FIG. 2K schematically shows an impedance current limiting pulse generation mechanism according to an embodiment of the present disclosure. As shown in FIG. 2K, the shutdown speed of the RESET switch is not only controlled with the constant slew rate but also with impedance current limiting, such that the rise/fall time of the switch is controlled by generating pulses at the IC end and introducing the pulses into the panel according to the embodiment illustrated by FIG. 2D, so as to reduce the chance of charge injection.

FIG. 2L is a block diagram of the impedance current limiting pulse generation mechanism functioning on a panel according to an embodiment of the present disclosure. As shown in FIG. 2L, to control the shutdown speed of the RESET switch, it is feasible to not only control the fall time from the IC but also allow the RST signal to turn off slower by effectuating impedance current limiting on the panel. In FIG. 2L, a slew rate configuring circuit (e.g., 21C) is implemented by using a plurality of buffer circuits and resistors coupled to the buffer circuits.

In further embodiments, the slew rate configuring circuit (e.g., 21A or 21B) in FIG. 2D or 2I can be implemented on the panel and regarded as a portion of the GOA circuit 11.

According to the aforesaid embodiment, the falling time/rise time of the RST switch is appropriate (for example, not too short) to thereby slow down the charge injection effect arising from the pixels during reset. The shutdown speed of the RST switch is controlled, such that the charge injection effect remains the same and does not change with the fall time/rise time of the buffer. Therefore, the shutdown speed of the reset switch is controlled, so as to inhibit the occurrence of charge injection.

Thirdly, systems, devices, and methods for dynamic offset adjustment in a fingerprint sensing driver or FDTI chip are introduced.

A mechanism for the dynamic signal offset adjustment in a fingerprint sensing driver or FDTI chip (mounted, for example, on a computation device (such as a smart device)) is described below.

In FTDI, a fingerprint sensor is mounted on a display panel. This has drawbacks as follows: the restrictive nature of the dark current of sensors; the offset caused by a non-fingerprint reflection light signal; the impossibility to amplify the fingerprint reflection light signal loaded onto the offset of an abnormal level, thereby intercepting part of the signal to therefore lose a dynamic range otherwise available for use by the signal, which in turn prevents the difference between noise and fingerprint crest-to-trough signal level from being widened, thereby aggravating the difficulty in algorithm recognition at the back end.

From the perspective of fingerprint reflection light signals, the offset is caused to a signal level for various reasons. On the whole, the offset relates to a finger position and a sensing zone.

The dynamic offset adjustment mechanism corrects the offset caused by non-fingerprint reflection light signals and dark current of the sensors in different finger press zones, as illustrated by embodiments and described below.

In an embodiment, FTDI is for use by large screens, whereas fingerprint detection positions are suitable for use by whole screens, wherein different press positions are different in terms of the offset caused by the non-fingerprint reflection light signals and dark current of the sensors.

In an embodiment, the dynamic offset adjustment mechanism corrects the offset caused by non-fingerprint reflection light signals and sensor dark current in different finger press zones.

In an embodiment, the input code of DAC is dynamically adapted to differences in patterns of fingerprint and selected zones.

In an embodiment, the input code of DAC is a relatively small value or an average in a specific zone of point reporting.

In an embodiment, the correction mechanism can also sense different finger crest-to-trough signals with respect to the sensor and can adaptively generate a corresponding offset compensation, and the average of the finger crest-to-trough signals lies at the full-scale center of the ADC input because of the compensation, such that the finger crest-to-trough signals swing in terms of voltage amplitude relative to its average, thereby attaining the maximum dynamic range.

Figure 3A:
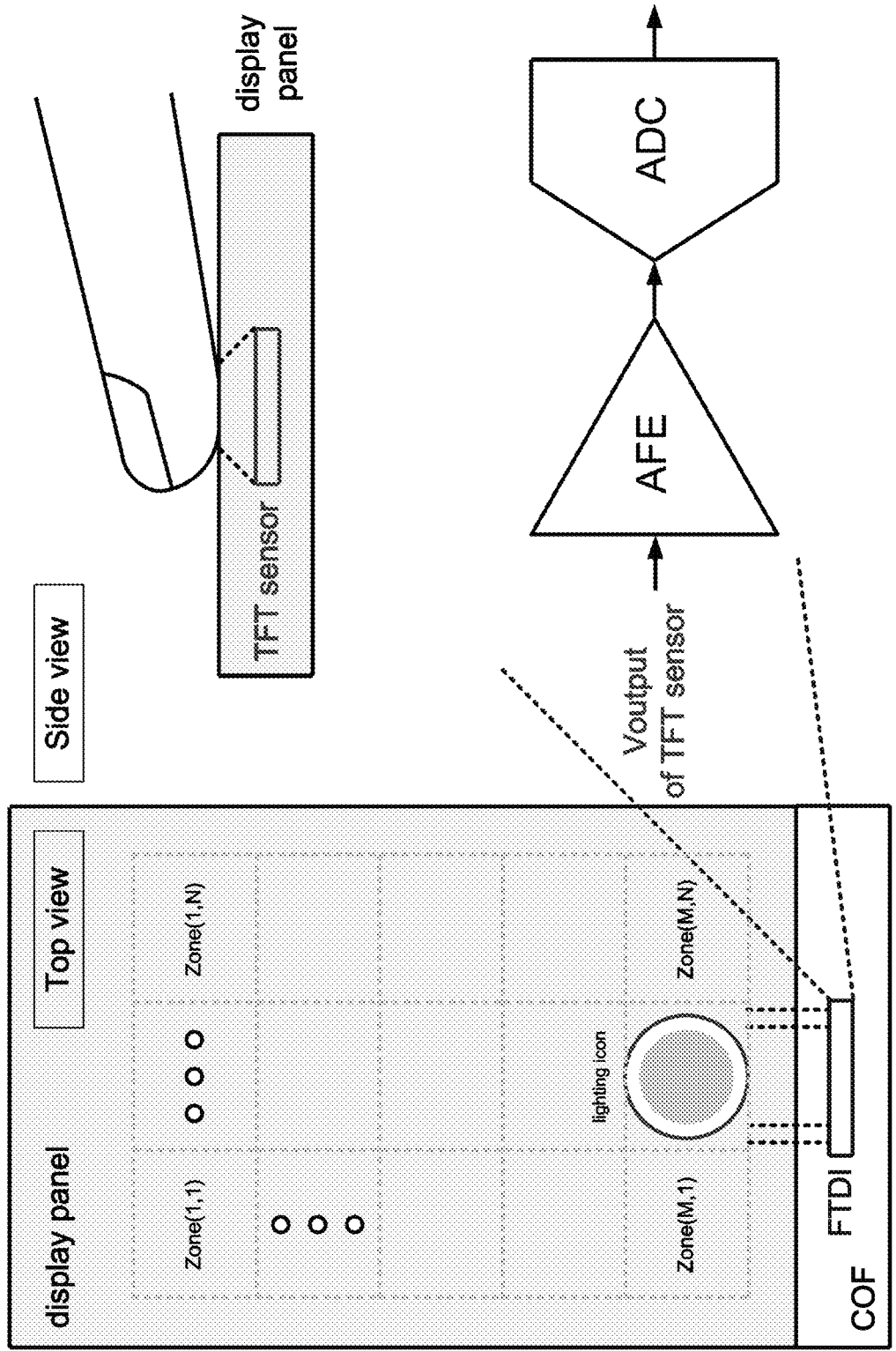
FIG. 3A schematically shows a display panel & FTDI fingerprint disabling process.

FIG. 3A schematically shows a display panel & FTDI fingerprint disabling process. Regarding FTDI fingerprint recognition, point reporting is performed on fingerprint press positions by touch control, and the fingerprint detection zone is instructed to trigger fingerprint recognition and then begin recognition process, including instructing the panel to cast a light ray on a point of finger press. After the light ray has reflected off the crests and troughs of the fingerprint, the light ray is converted to a voltage signal by TFT sensors on the panel. Then, the voltage signal is sent to FTDI to undergo IC-based analog signal amplification process and A/D conversion. Finally, the entire image data is output to the back end to undergo algorithm recognition, so as to finalize the fingerprint disabling process. Referring to FIG. 3A, the TFT sensors, which are arranged in an array, have full coverage over the entire display panel to facilitate the fingerprint disabling operation taking place at whatever location.

Figure 3B:
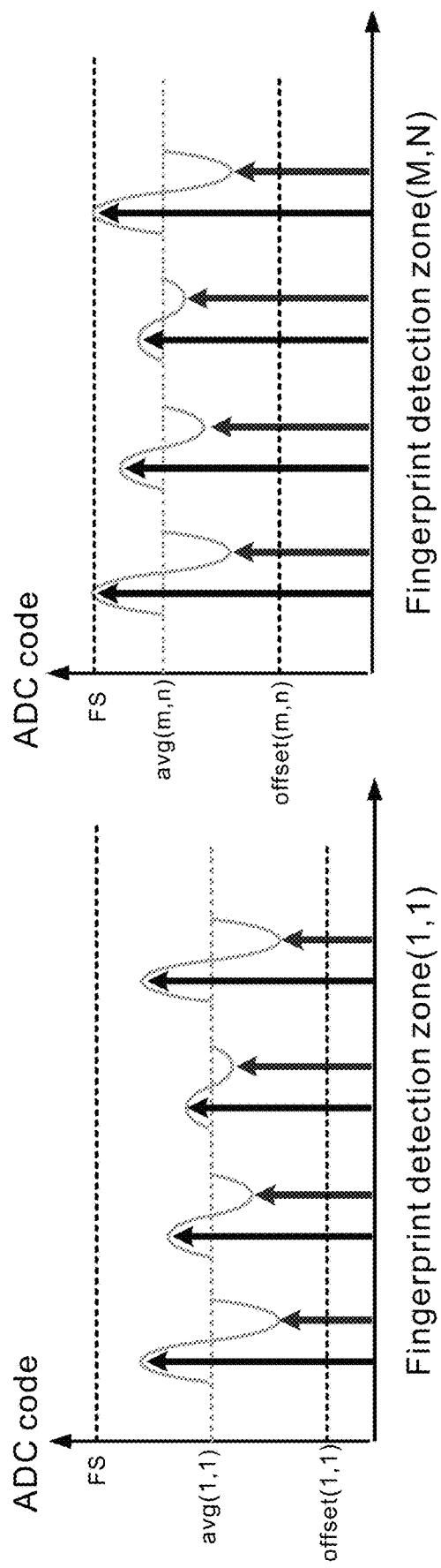
FIG. 3B are schematic views of finger crest-to-trough signals sensed by a sensor.

In large screen application, a large screen is divided into different fingerprint detection zones (Zone(1,1) to Zone(M, N)), such that fingerprint recognition can take place in whatever detection zones the finger is detected pressing on. An applicable fingerprint detection zone varies with a fingerprint press position. However, the offset caused by non-fingerprint reflection light signals and dark current of the sensors varies from fingerprint detection zone to fingerprint detection zone and thus must be adjusted flexibly and uniquely. Take a fingerprint detection zone as an example, the sensors sense finger crest-to-trough signals indicated by red/green cylinders, including the offset caused by dark current and non-fingerprint reflection light signals. The difference between crest-to-trough signals is effective information required for recognition rather than any other offset. Referring to FIG. 3B, the offset varies from zone to zone (offset(1,1)≠offset(M,N)), and thus its average varies from zone to zone (avg(1,1)≠avg(M,N)), rendering it impossible to correct any required adjustment with a fixed offset.

Figure 3C:
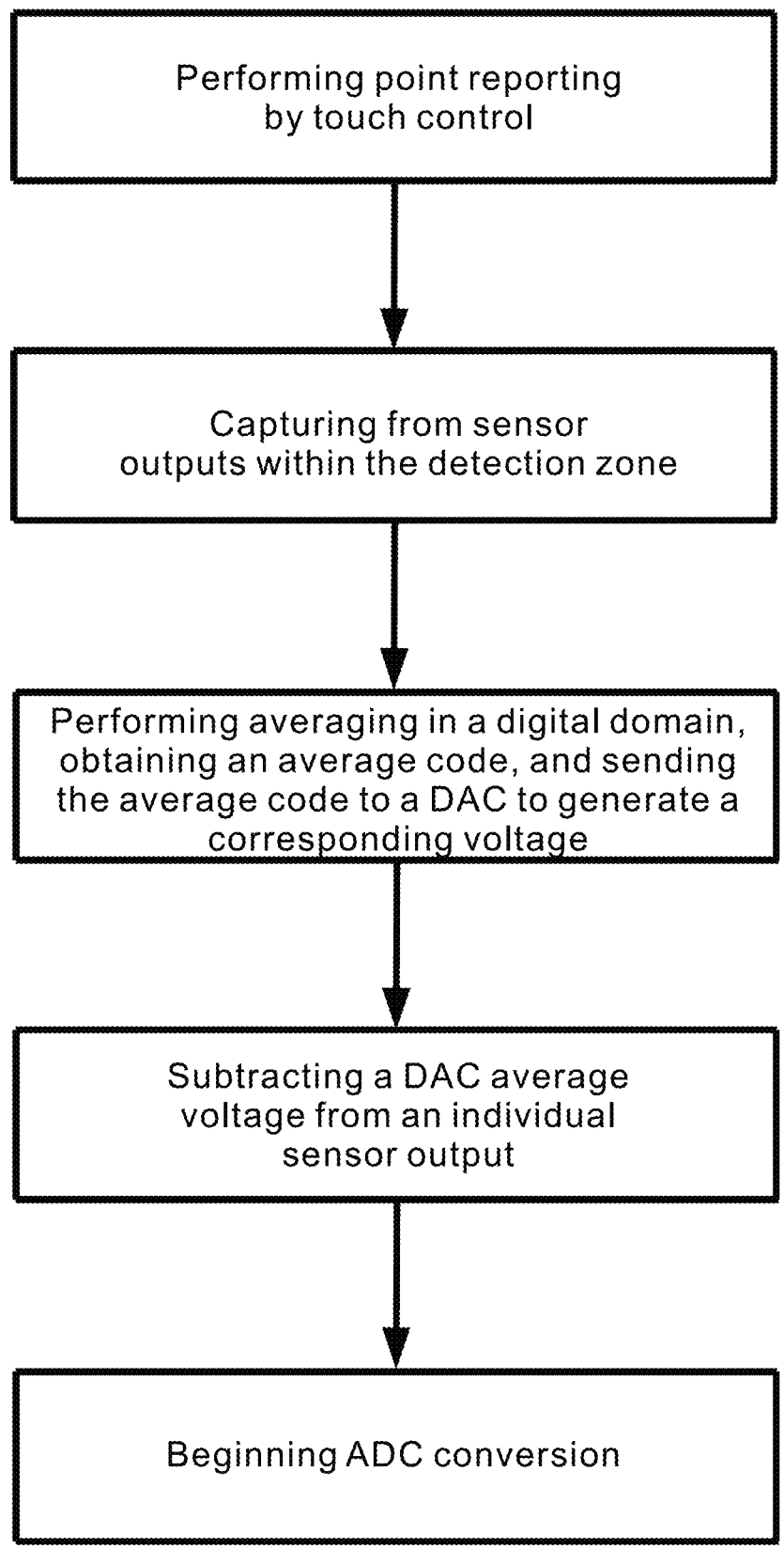
FIG. 3C is a schematic view of the process steps of a dynamic offset adjustment mechanism according to an embodiment of the present disclosure.

FIG. 3C is a schematic view of the process steps of a dynamic offset adjustment mechanism according to an embodiment of the present disclosure. As shown in FIG. 3C, the dynamic offset adjustment mechanism (or method) comprises the steps of:

(S110) performing point reporting by touch control and then selecting the fingerprint detection zone;

(S120) capturing crest-to-trough signals, dark current and any other ambient offset from sensor outputs within the detection zone;

(S130) performing averaging in a digital domain, obtaining an average code, and sending the average code to a DAC to generate a corresponding voltage avg(1,1);

(S140) subtracting a DAC average voltage from an individual sensor output; and (S150) beginning ADC conversion.

Figure 3D:
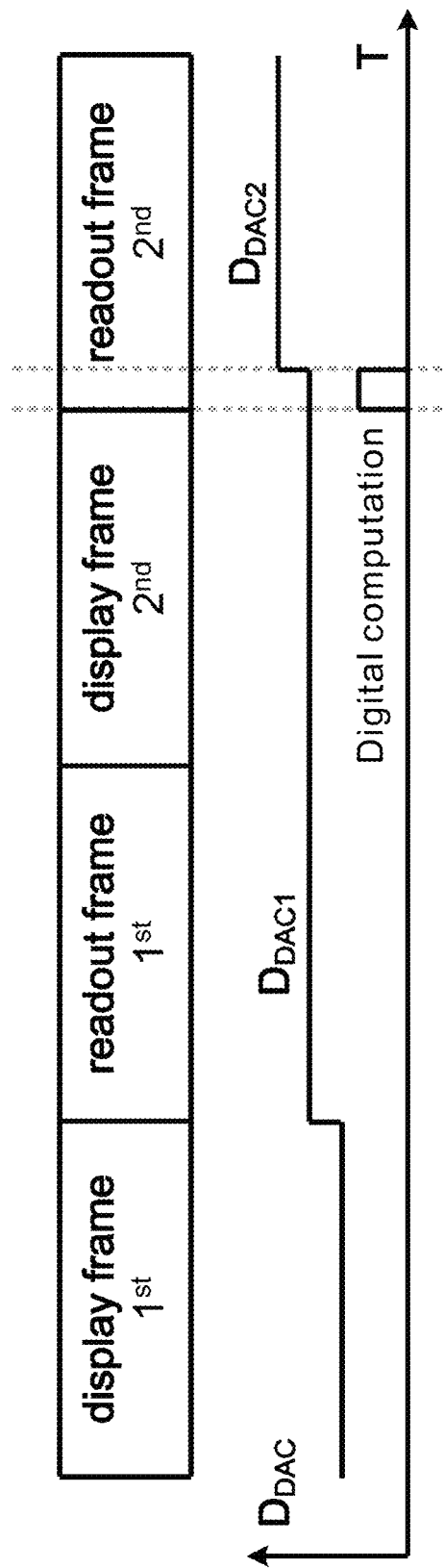
FIG. 3D is a schematic view of $D_{DAC}$ switching and digital computation time.

FIG. 3D is a schematic view of $D_{DAC}$ switching and digital computation time. FIG. 3D schematically shows some operating periods in a fingerprint sensing driver or FDTI chip, wherein readout frame $1^{st}$ schematically shows a time interval at which the fingerprint sensor undergoes reset operation, display frame $2^{nd}$ corresponds to a time interval for exposure, and readout frame $2^{nd}$ schematically shows a time interval at which data capturing is performed on sensor outputs within the detection zone. $D_{DAC1}$ is a predetermined value in readout frame $1^{st}$. Data capturing from sensor outputs within the detection zone by display frame $2^{nd}$ entails performing preliminary capturing (also known as pre-scan), performing digital computation (for example, time intervals indicated by border lines of digital computation in FIG. 3D) and obtaining an average code ($D_{DAC2}$), wherein, in readout frame $2^{nd}$, the average code ($D_{DAC2}$) is fed back to the DAC to generate a corresponding average voltage $V_{DAC}$, such that, given the code ($D_{DAC2}$), data capturing is performed on the sensor outputs within the detection zone once again. As shown in FIG. 3D, a curve corresponding to $D_{DAC}$ schematically shows variations in $D_{DAC}$ without implying that $D_{DAC}$ is ever-increasing. Implementation of this embodiment is not limited by this example.

Figure 3E:
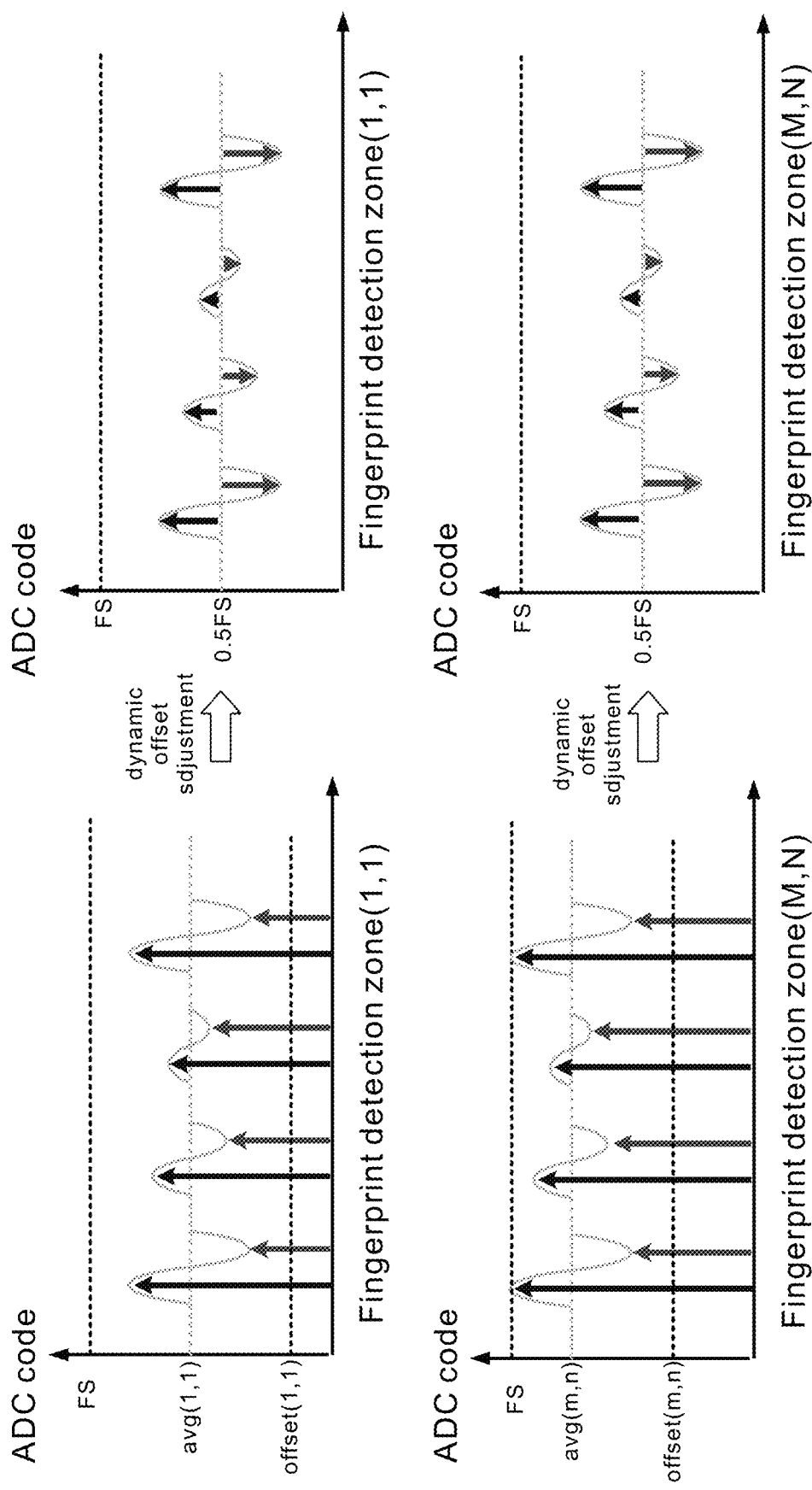
FIG. 3E schematically shows that, upon compensation, DAC average voltage is subtracted from individual sensor output.

FIG. 3E schematically shows that, upon compensation, DAC average voltage is subtracted from individual sensor output. Upon compensation, the offset is removed as a result of the subtraction of the DAC average voltage from the individual sensor output, such that the average of finger crest-to-trough signals lies at the full-scale center of the ADC input. The finger crest-to-trough signals read out by individual sensors swing in terms of voltage amplitude relative to its average, thereby attaining the maximum dynamic range. Although avg(1,1) to avg(m,n) of the fingerprint detection zones vary from fingerprint pattern to fingerprint pattern, the fingerprint center always falls at the 0.5 FS position as a result of correction performed with a closed loop. As shown in FIG. 3E, FS means full-scale.

Figure 3F:
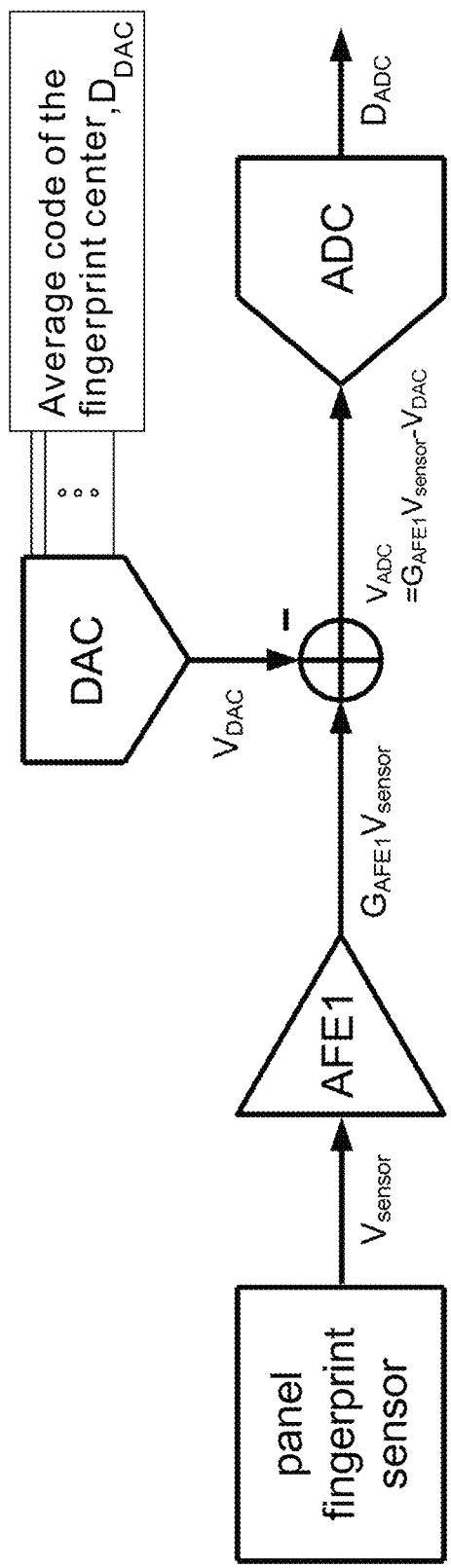
FIG. 3F is a block diagram of the dynamic offset adjustment mechanism and required analog modules according to an embodiment of the present disclosure.

FIG. 3F is a block diagram of the dynamic offset adjustment mechanism and required analog modules according to an embodiment of the present disclosure. In an embodiment illustrated by FIG. 3F, a digital average module is required to select the codes obtained by conversion carried out at sensor outputs within the detection zones to undergo averaging and obtain an average code($D_{DAC}$), wherein a DAC analog module generates a corresponding voltage output $V_{DAC}$, such that the average voltage generated by the DAC is subtracted from individual sensor output, as expressed by the equation $V_{ADC}=(G_{AFE1}V_{sensor}-V_{DAC})$. After that, ADC begins.

Figure 3G:
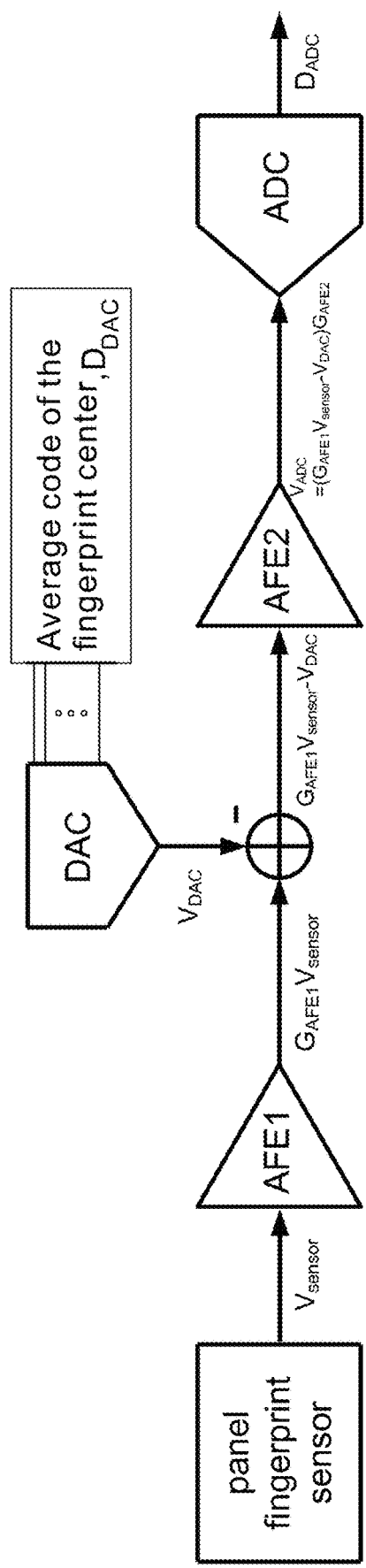
FIG. 3G is a block diagram of the dynamic offset adjustment mechanism according to another embodiment of the present disclosure, showing an additional AFE2 analog module for amplifying crest-to-trough signal difference increment.

FIG. 3G is a block diagram of a dynamic offset adjustment mechanism according to another embodiment of the present disclosure, showing an additional AFE2 analog module for amplifying crest-to-trough signal difference increment. In this embodiment, upon implementation of the dynamic offset adjustment mechanism, finger crest-to-trough signals read out by individual sensors swing in terms of voltage amplitude relative to its average, and its center lies at 0.5 FS, rendering it feasible to place an additional AFE2 in front of the ADC. Further amplification of the effective difference between the crest-to-trough signals of data sensors is achieved by $V_{ADC}=[G_{AFE1}V_{sensor}-V_{DAC}]G_{AFE2}$, thereby facilitating algorithm recognition.

For instance, the digital average module in the aforesaid embodiment selects the codes obtained by conversion carried out at sensor outputs within the detection zones to undergo averaging and obtains an average code ($D_{DAC}$) by following the steps below.

(S210) performing point reporting by touch control and then starting the selected fingerprint detection zones;

(S220) determining whether to perform translation of the point reporting position, wherein the required pixel number and ROW number are adjustable to allow individual pixel positions required for averaging to lie within the selected ZONE and prevent acquisition of any empty pixel output which might otherwise lead to an overly low average;

(S230) observing a histogram of data, screening data to be entered into an average sample space, creating two thresholds (for example, both Vth_1 and Vth_h are adjustable), and collecting pixel outputs which fall within the range, so as to ensure the accuracy of the fingerprint crest-to-trough average; and (S240) averaging the screened data within a sample space to obtain a DAC code for generating an analog voltage output which represents the fingerprint crest-to-trough average.

When the individual pixels within a selected zone enter an average sample space, pixels located in the vicinity of the reported point and distanced therefrom in upward, downward, leftward and rightward directions are selected according to touch control point reporting, wherein both the pixel number and row number are adjustable. However, implementation of this embodiment is not limited by this example.

Figure 3H:
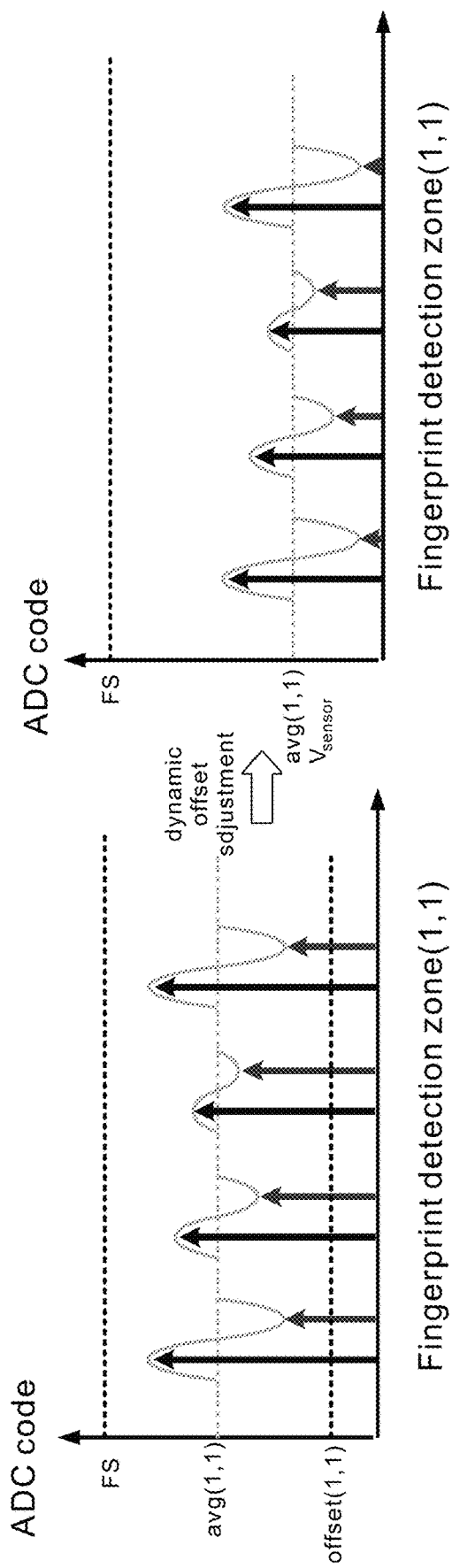
FIG. 3H schematically shows another way of searching for $D_{DAC}$ according to an embodiment of the present disclosure.

FIG. 3H schematically shows another way of searching for $D_{DAC}$ according to an embodiment of the present disclosure. In this embodiment, signals output by the sensors are searched for a relatively small value of $V_{sensor}$ to generate $D_{DAC}$ which is then fed back to the DAC to generate a corresponding voltage, thereby retaining effective crest-to-trough signal differences.

Figure 3I:
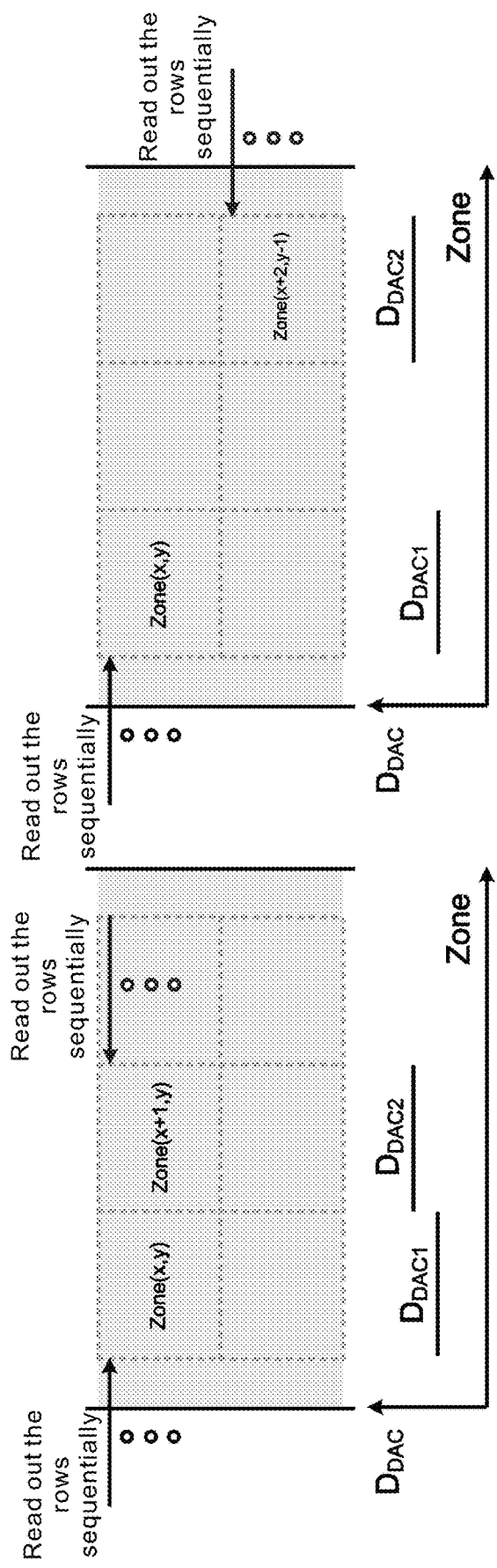
FIG. 3I schematically shows the differences of corresponding finger press zones when simultaneous readout of multiple finger recognition is supported, fingerprint signals of multiple zones are sequentially read out, indicating that $D_{DAC}$ must be adjusted accordingly.

FIG. 3I schematically shows the differences of corresponding finger press zones when simultaneous readout of multiple finger recognition is supported, indicating that $D_{DAC}$ must be adjusted accordingly. In this embodiment, given the differences of corresponding finger press zones when simultaneous readout of multiple finger recognition is supported, fingerprint signals of multiple zones are sequentially read out. During the aforesaid process, the $D_{DAC}$ used therein must be adjusted accordingly (for example, DAC1 & DAC2; only two are shown in the diagram for illustrative sake, but they can be applied to multiple fingers.)

Figure 3J:
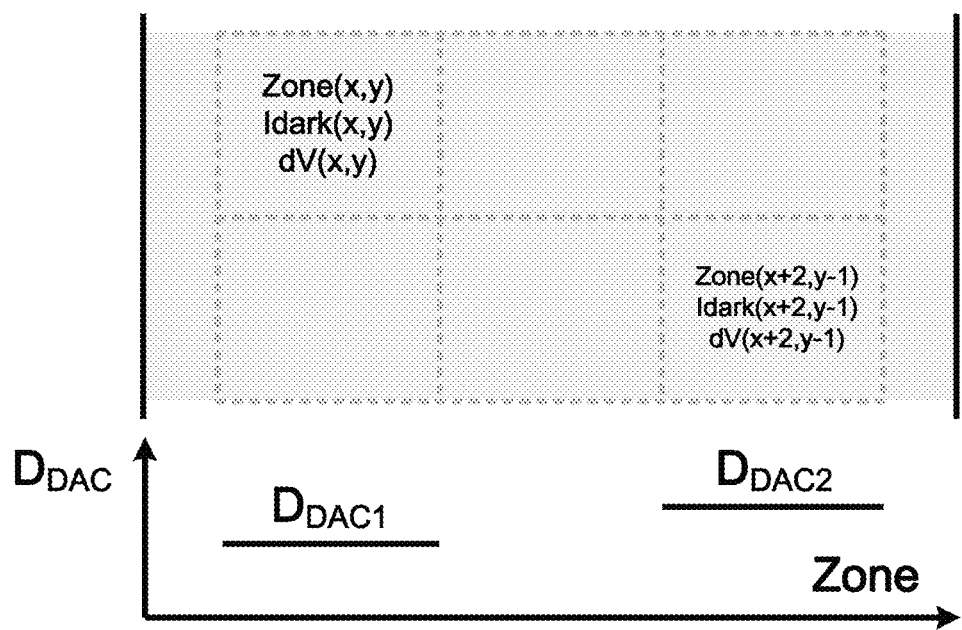
FIG. 3J schematically shows difference between the zone on a large screen, as well as sensor dark current and sensor power drop therebetween.

FIG. 3J schematically shows difference between the zone on a large screen, as well as sensor dark current and sensor power drop therebetween. In this embodiment, offset(dV) caused by sensor power drop and different levels of sensor dark current (Idark), as found in the zones of the large screen, can be eliminated by this method.

The aforesaid embodiments are effective in achieving dynamic signal offset adjustment, such that the finger crest-to-trough signals swing in terms of voltage amplitude relative to its average, thereby attaining the maximum dynamic range.

Fourthly, systems, devices, and methods for reference voltage adjustment in a fingerprint sensing driver or FDTI chip are introduced.

A fingerprint sensing driver or FDTI chip (mounted, for example, on a computation device (such as a smart device)) for use in an FTDI CDS (correlated double sampling) reference voltage adaptation mechanism is described below.

Figure 4A:
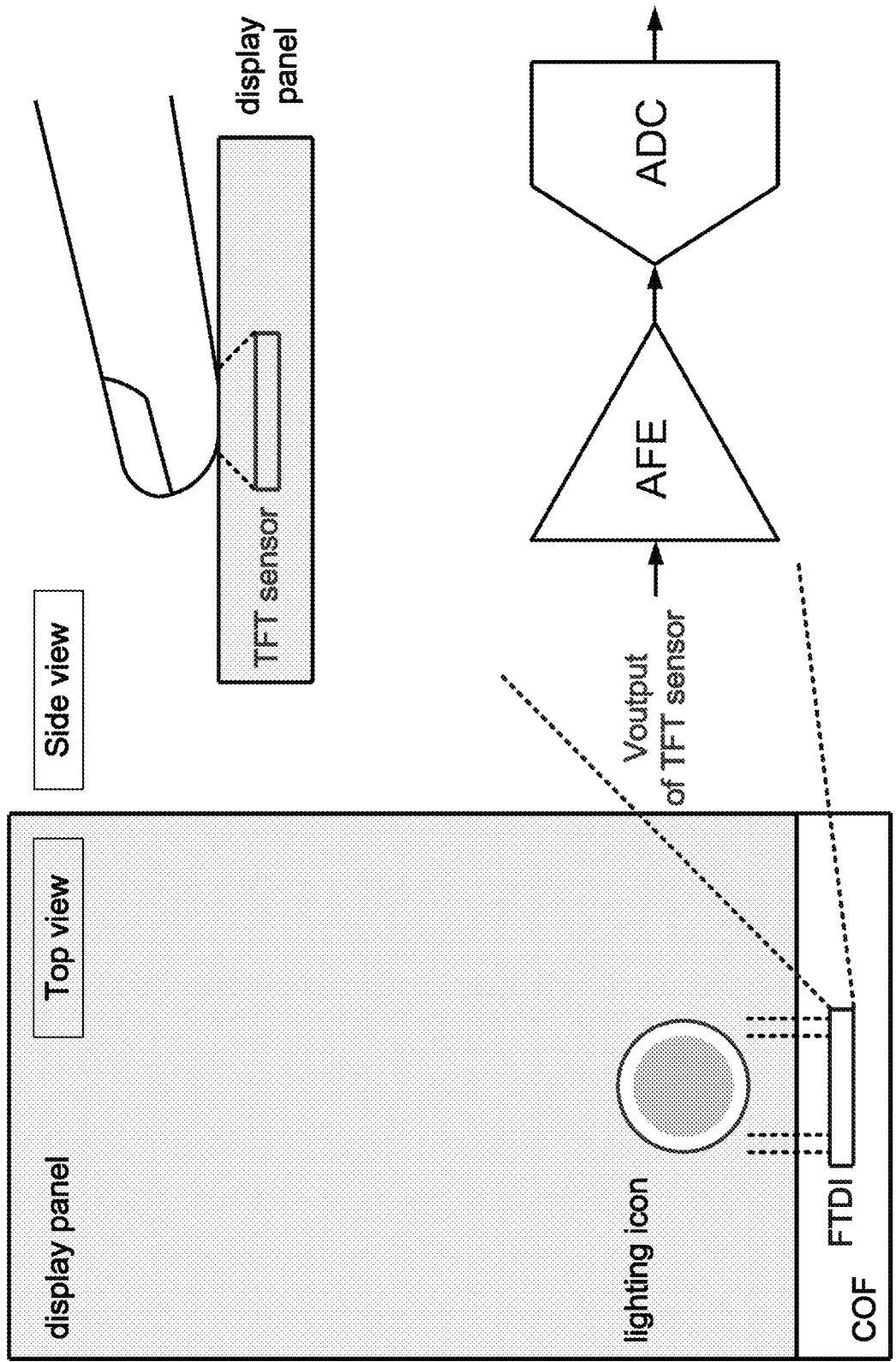
FIG. 4A schematically shows a display panel & FTDI fingerprint disabling process.

FIG. 4A schematically shows a display panel & FTDI fingerprint disabling process. The FTDI fingerprint recognition operation includes instructing the panel to cast a light ray on a point of finger press. After the light ray has reflected off the crests and troughs of the fingerprint, the light ray is converted to a voltage signal by TFT sensors on the panel. Then, the voltage signal is sent to FTDI to undergo IC-based analog signal amplification process and A/D conversion. Finally, the entire image data is output to the back end to undergo algorithm recognition, so as to finalize the fingerprint disabling process. Referring to FIG. 4A, the TFT sensors, which are arranged in an array, have full coverage over the entire display panel to facilitate the fingerprint disabling operation taking place at whatever location.

When a fingerprint sensor is applied to the entire panel, readout signal wires must penetrate the entire panel. Owing to the long readout signal traces and large parasitic capacitance, a delay occurs when AFE read outs an induction current of a photodiode.

At present, the reading method of the fingerprint passive optical sensor on the panel is to use the CDS method to read voltages, and the CDS can be divided into or include four phases (or regarded as steps).

Figure 4B:
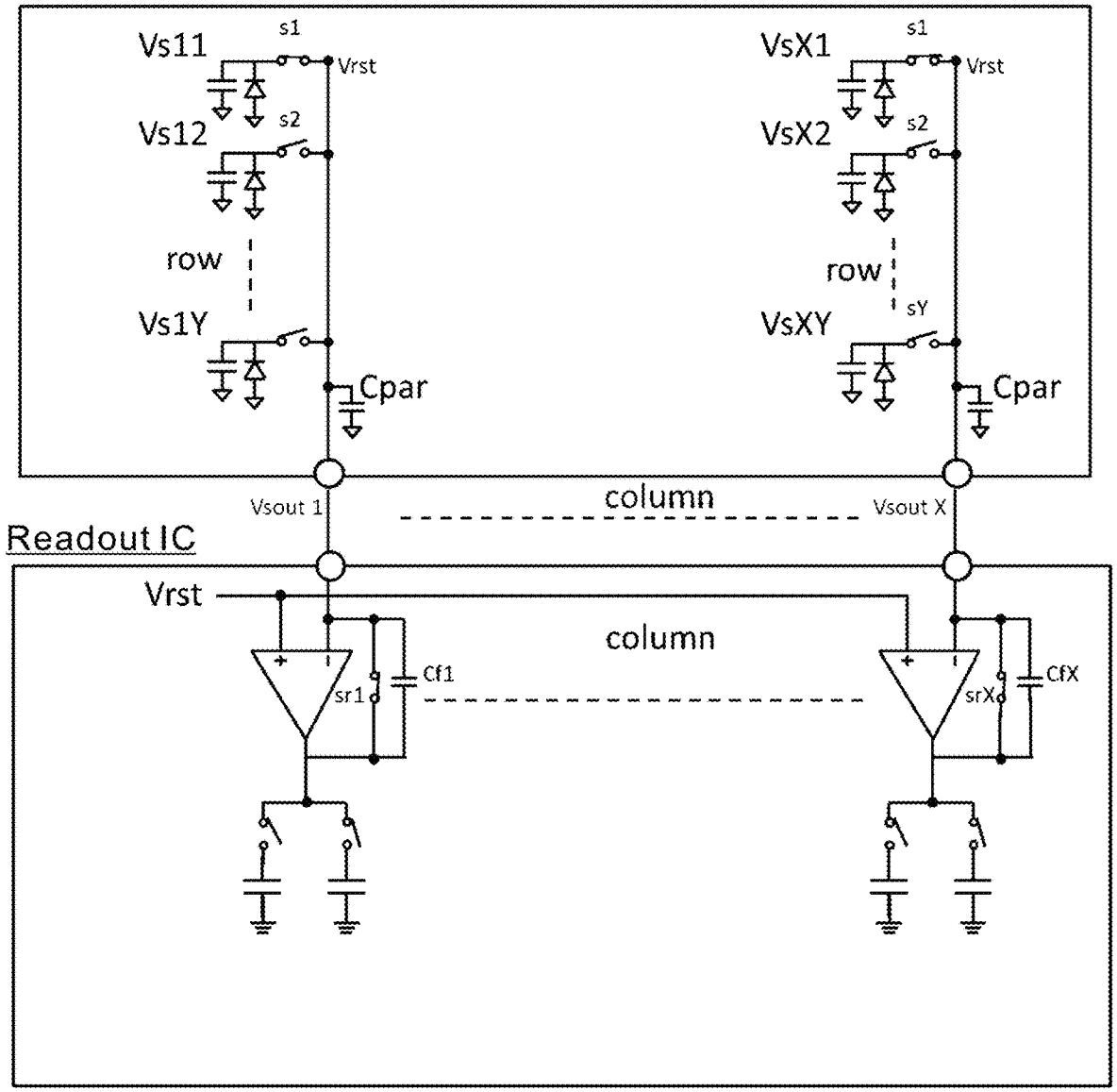
FIG. 4B is a schematic view of a panel and readout IC, schematically showing reset panel photodiode voltage.

First, for example, as shown in FIG. 4B, each of pixels on the panel is reset. Each column of the panel corresponds to a front-end amplifier on the IC. The feedback switch of the front-end amplifier is short-circuited, such that the OP output voltage is locked at the reset voltage Vrst, so as to control switches s1, s2 . . . sY to turn on one by one sequentially and turn off after resetting the voltage. The sensing array's voltages of the entire panel are reset to the voltage Vrst.

Second, after the photodiode has its voltage reset to Vrst, the finger and the panel glass differ from each other in refractive index at the contact surface therebetween because of light irradiation. As a result, the reflected light rays differ in brightness, allowing the photodiodes to generate different photocurrents to be stored in the respective capacitors of the pixels.

Figure 4C:
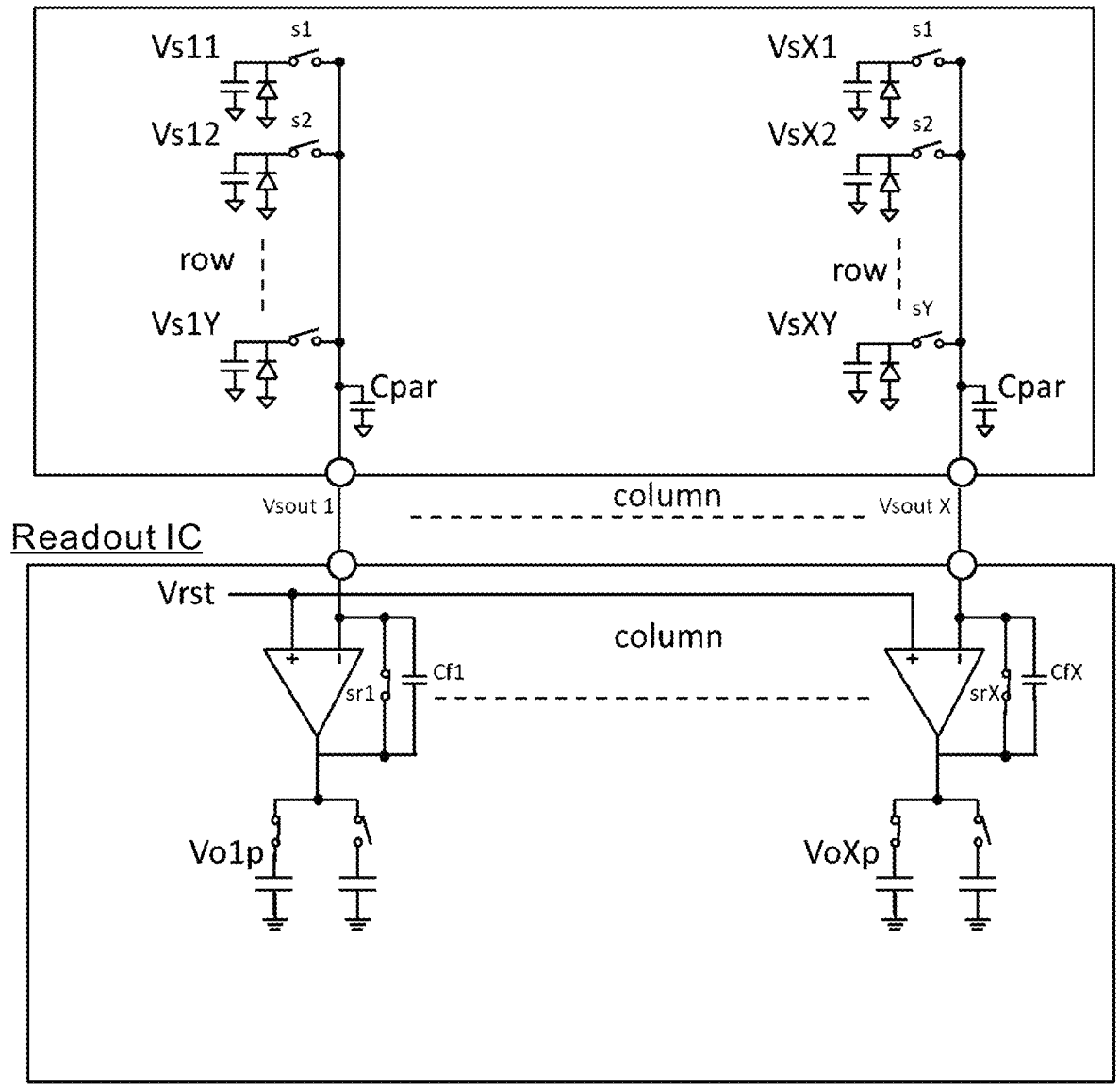
FIG. 4C is a schematic view of the panel and readout IC, schematically showing CDS first-instance sampling.

Third, for example, as shown in FIG. 4C, the front-end amplifier is fed back and short-circuited without turning on the pixels. Meanwhile, Cpar is charged to Vrst, and two ends of Cf1 to CfX are discharged until there is no voltage difference therebetween. At this time, first-instance sampling of Vo1p to Voxp is performed to sample Vrst plus the offset voltage of OP.

Figure 4D:
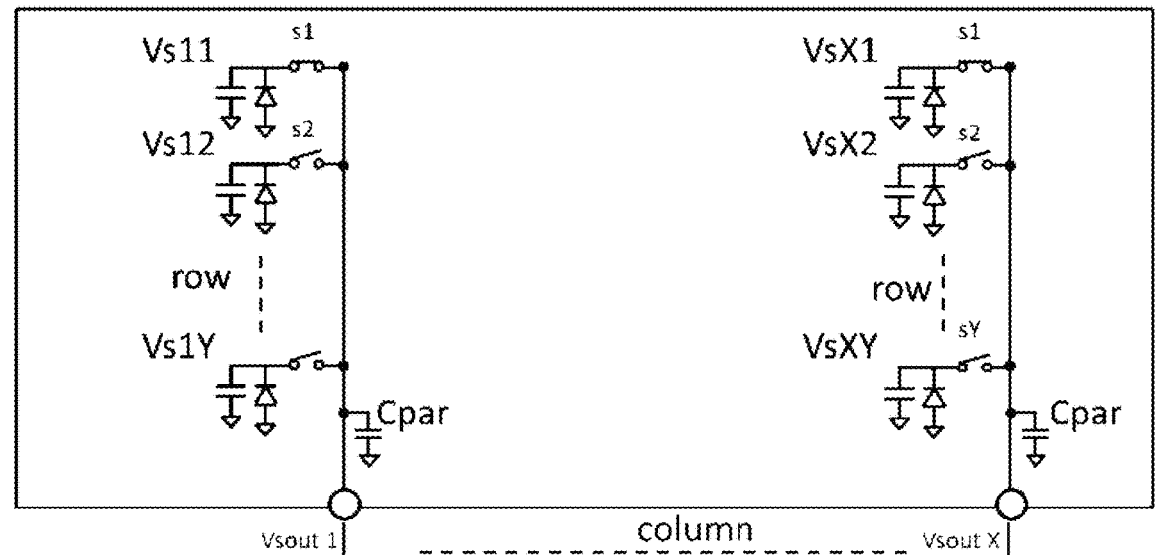
FIG. 4D is a schematic view of the panel and readout IC, schematically showing CDS second-instance sampling and subtraction readout.
Figure 4D:
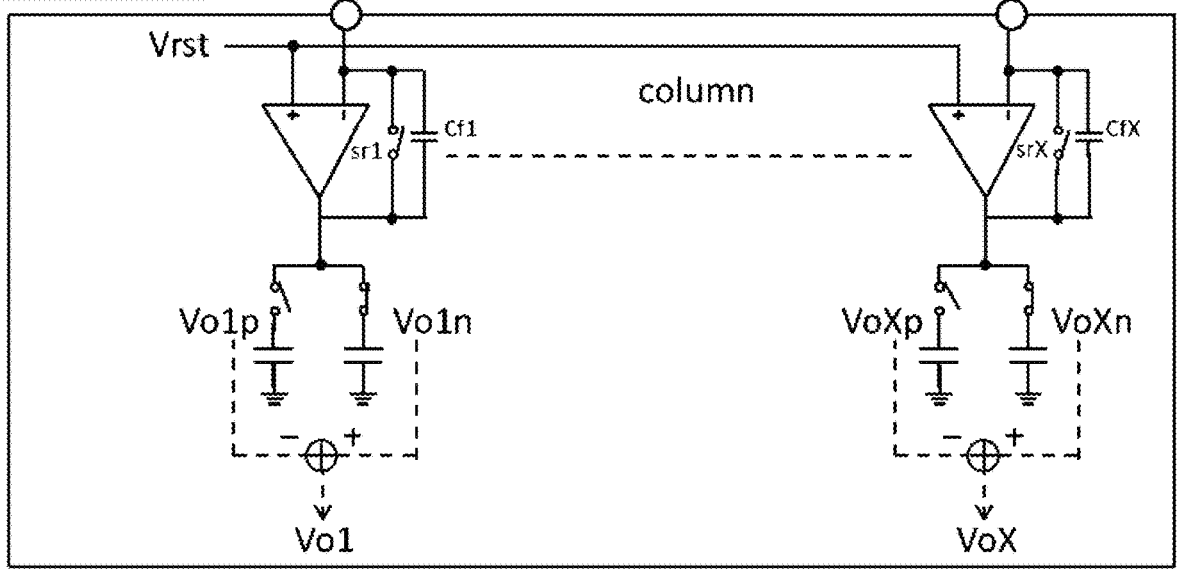

Fourth, for example, as shown in FIG. 4D, the pixel switch is turned on. Since voltage Vsout is equal to Vrst plus the offset voltage of OP because of the OP feedback loop, pixel exposure electrical charges are amplified to the AFE output end. At this time, second-instance sampling of Vo1n to Voxn is performed to sample Vrst plus the offset voltage of OP plus Qlight/Cf.

By subtracting samples of the first-instance sampling from those of the second-instance sampling, offset and rst (Vrst) voltages can be eliminated to thereby obtain Qlight/Cf as Vo1 to Vox. The third and fourth steps are repeated to finish reading an image for the entire panel.

Figure 4E:
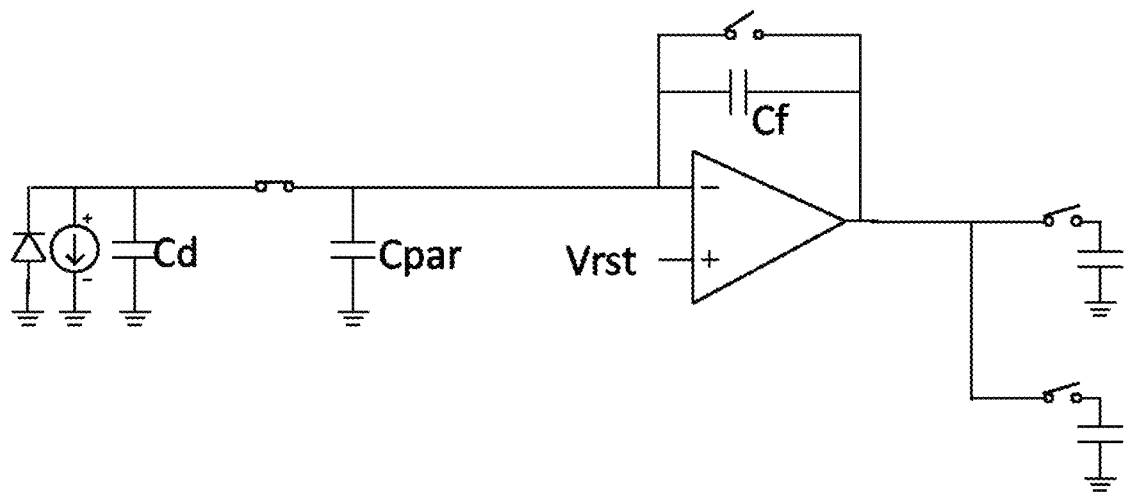
FIG. 4E is a block diagram of a feedback loop for use in second-instance sampling.

FIG. 4E is a block diagram of a feedback loop for use in second-instance sampling. Since Cpar of trace Sout which penetrates a display panel is very large (around the scale of 50 pF). However, to induce electrical charges to convert voltage, the feedback capacitance on the OP is small (around the scale of 0.1 pF), such that the feedback which Cpar gives Cf allows the OP bandwidth to attenuate around 500 times relative to the unit gain bandwidth, and the two instances of CDS sampling need a relatively long stable time period.

Therefore, with the Cpar parasitic capacitance being large, AFE needs a long stable time period. Therefore, in the embodiments described below, the reference voltage of CDS is adjusted by exposure voltage each time, such that the readout voltage levels of CDS in the two instances approximate to each other. By reducing the output voltage difference of AFE in the two instances, the required stable time period can be reduced. Therefore, thanks to the adjustment of the CDS reference voltage, the embodiments enable the reduction of the voltage difference of CDS in the two instances of sampling, the reduction of the stable time period required for the AFE output between the two instances of sampling, and thus the enhancement of the efficiency of capturing signals.

Since Cpar of trace Sout which penetrates a display panel is very large (around the scale of 50 pF). However, to induce electrical charges to convert voltage, the feedback capacitance on the OP is small (around the scale of 0.1 pF), such that the feedback which Cpar gives Cf allows the OP bandwidth to attenuate around 500 times relative to the unit gain bandwidth, and the two instances of CDS sampling need a relatively long stable time period.

Figure 4F:
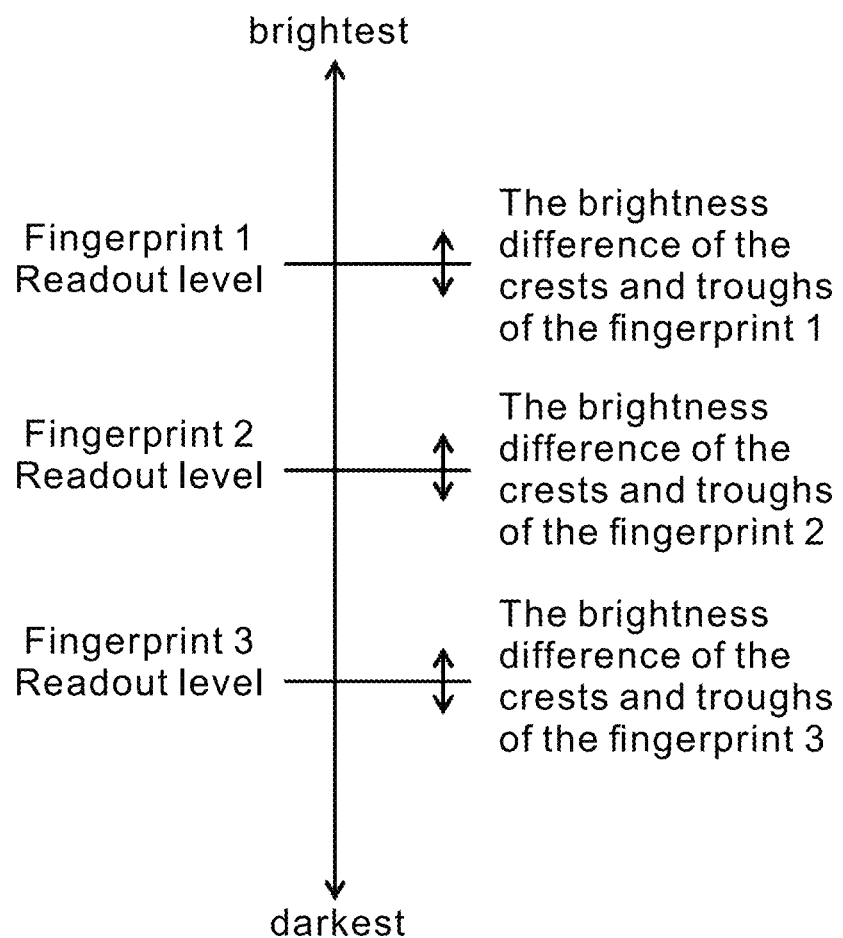
FIG. 4F is a schematic view of fingerprint brightness distribution.

FIG. 4F is a schematic view of fingerprint brightness distribution. As shown in FIG. 4F, the brightness difference of the crests and troughs of the fingerprint is very small (around 10 mV), but the overall ambient difference is large (the scale of 1V).

Figure 4G:
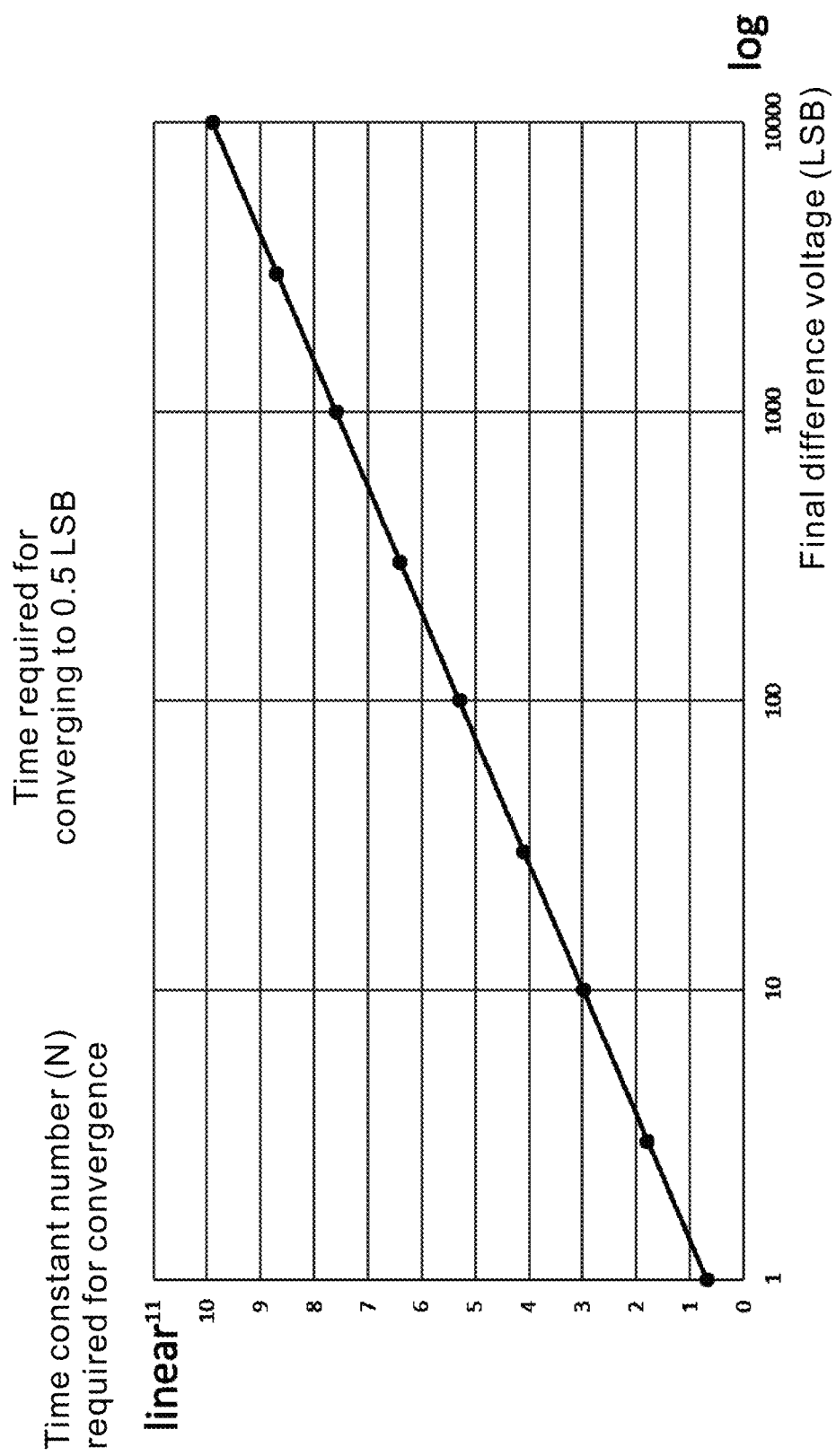
FIG. 4G shows variable relationship between time constant number (N) required for convergence and final difference voltage (LSB), thereby obtaining the convergence time required for fingerprint voltage and reference voltage difference AFE.

FIG. 4G shows variable relationship between time constant number (N) required for convergence and final difference voltage (LSB), thereby obtaining the convergence time required for fingerprint voltage and reference voltage difference AFE. As shown in FIG. 4G, if the finger average voltage is used as a reference value during CDS readout, the voltage difference which must be changed for the sake of output during AFE readout can be reduced; thus, not only can the convergence time required for the finger pixel brightness difference be reduced, but, given a fixed convergence time, reading precision can also be enhanced.

Figure 4H:
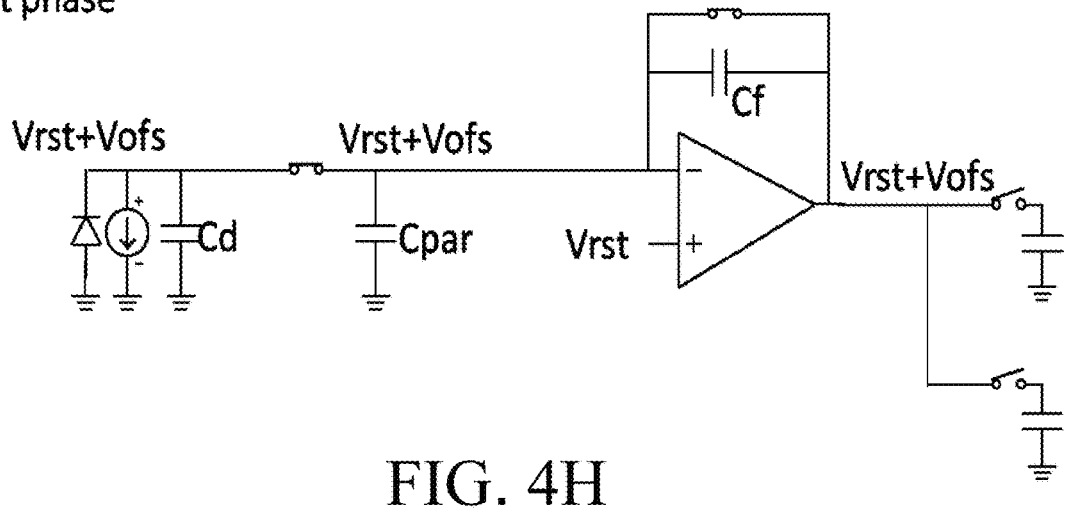
FIG. 4H shows an example of the operation of the loop in reset phase.

FIG. 4H shows an example of the operation of the loop in reset phase. As shown in FIG. 4H, in reset phase, the required reset voltage is output by OP to the photodiode. The OP has an offset voltage under which the voltage is reset to Vrst+Vofs.

Figure 4I:
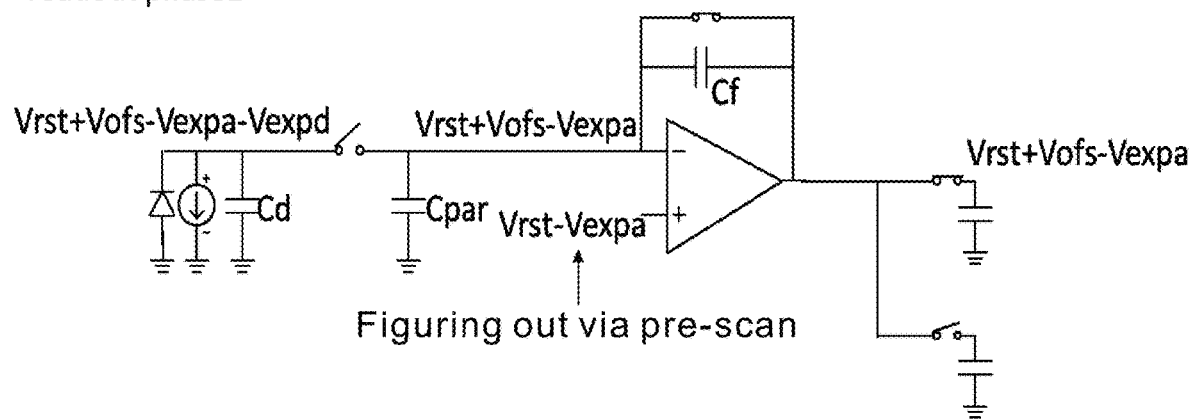
FIG. 4I shows an example of the operation of the loop in readout phase 1.

Upon completion of exposure, a pre-scan finger center position exposure signal is used as a reference value for the entire finger reading signal, where Vexpa denotes the average exposure voltage at the finger center point, and Vexpd denotes the difference between the finger pixel and the finger center average. Exposure starts from Vrst, the finger reference voltage uses Vrst−Vexpa as a reference value. FIG. 4I shows an example of the operation of the loop in readout phase 1. As shown in FIG. 4I, in CDS phase1, Vrst−Vexpa (which includes a predetermined value) is applied to the OP positive end, such that Vrst+Vofs−Vexpa can be obtained by performing CDS reading for the first time after feedback and used as a first-instance reading voltage.

Figure 4J:
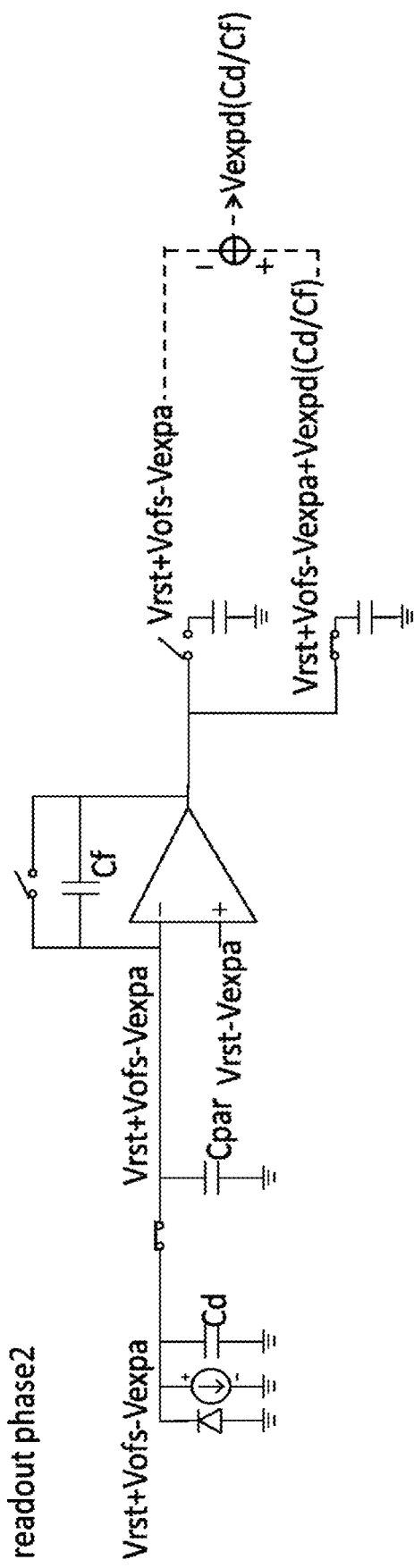
FIG. 4J shows an example of the operation of the loop in readout phase 2.

FIG. 4J shows an example of the operation of the loop in readout phase 2. The exposure voltage Vrst+Vofs−Vexpa−Vexpd is read out by the second-instance reading of CDS, and by way of the feedback of the OP, Vexpd is read out partially and amplified to OP output end. The CDS second-instance sampling voltage is Vrst+Vofs−Vexpa+Vexpd(Cd/Cf). Between the two instances of sampling, the voltage difference of OP output is expressed by Vexpd(Cd/Cf). It take Vexpd(Cd/Cf) little time to get stable, thanks to the small voltage difference between the finger center average and fingerprint pixel.

Figure 4K:
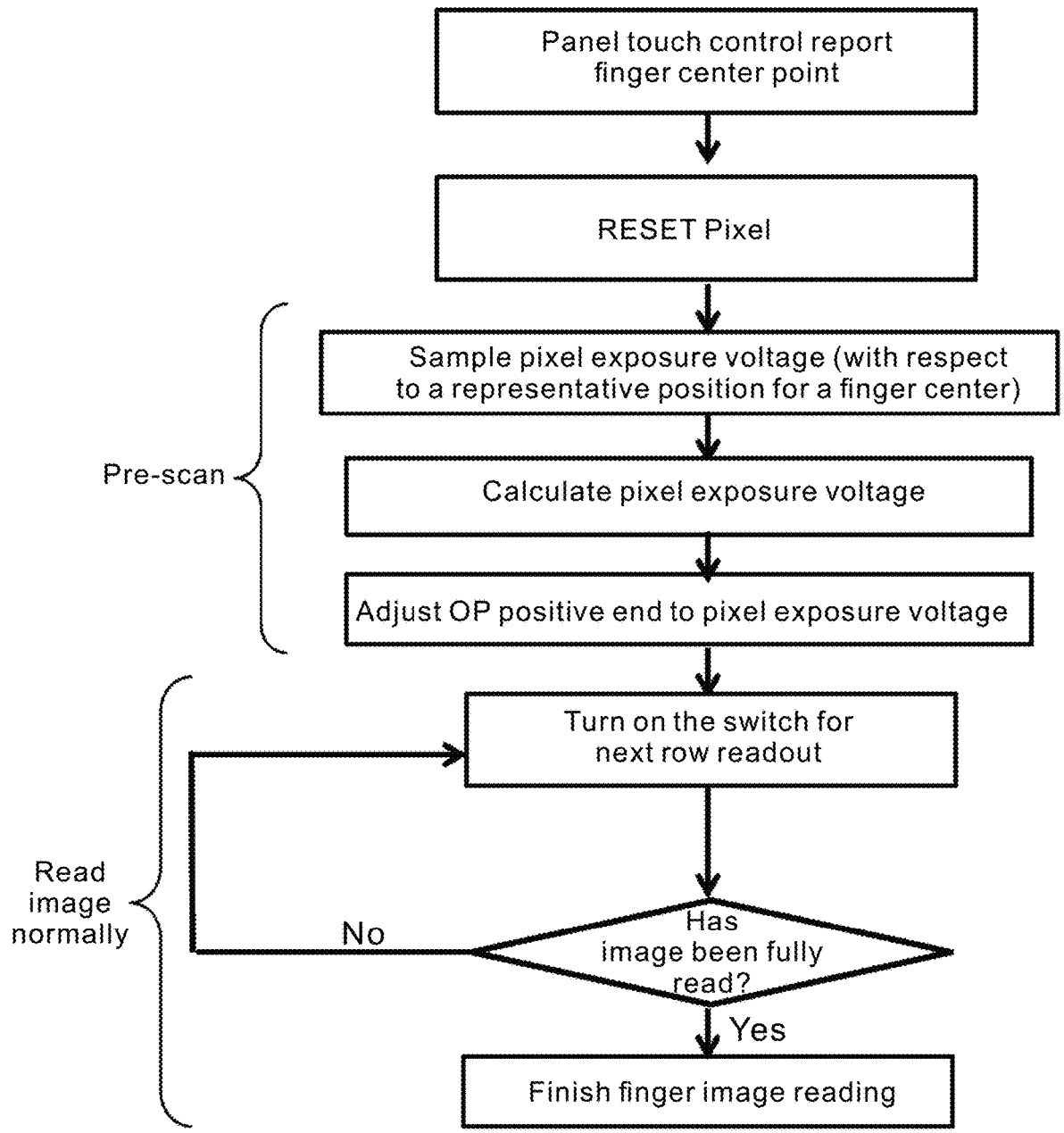
FIG. 4K is a flowchart of FTDI CDS reference voltage adaptation mechanism according to an embodiment of the present disclosure.

FIG. 4K is a flowchart of FTDI CDS reference voltage adaptation mechanism according to an embodiment of the present disclosure. As shown in FIG. 4K, the embodiment of this process includes pre-scan step and normal reading step. In this embodiment, after the panel touch control unit has reported a finger position, readout sampling is performed at the finger center position or a position sufficiently indicative of finger exposure. After the voltage has been computed, the voltage is provided to the positive end of the OP and used as a reference voltage. Under this voltage, images of the entire finger are configured to be read fully and sequentially, thereby reducing AFE image reading convergence time.

Figure 4L:
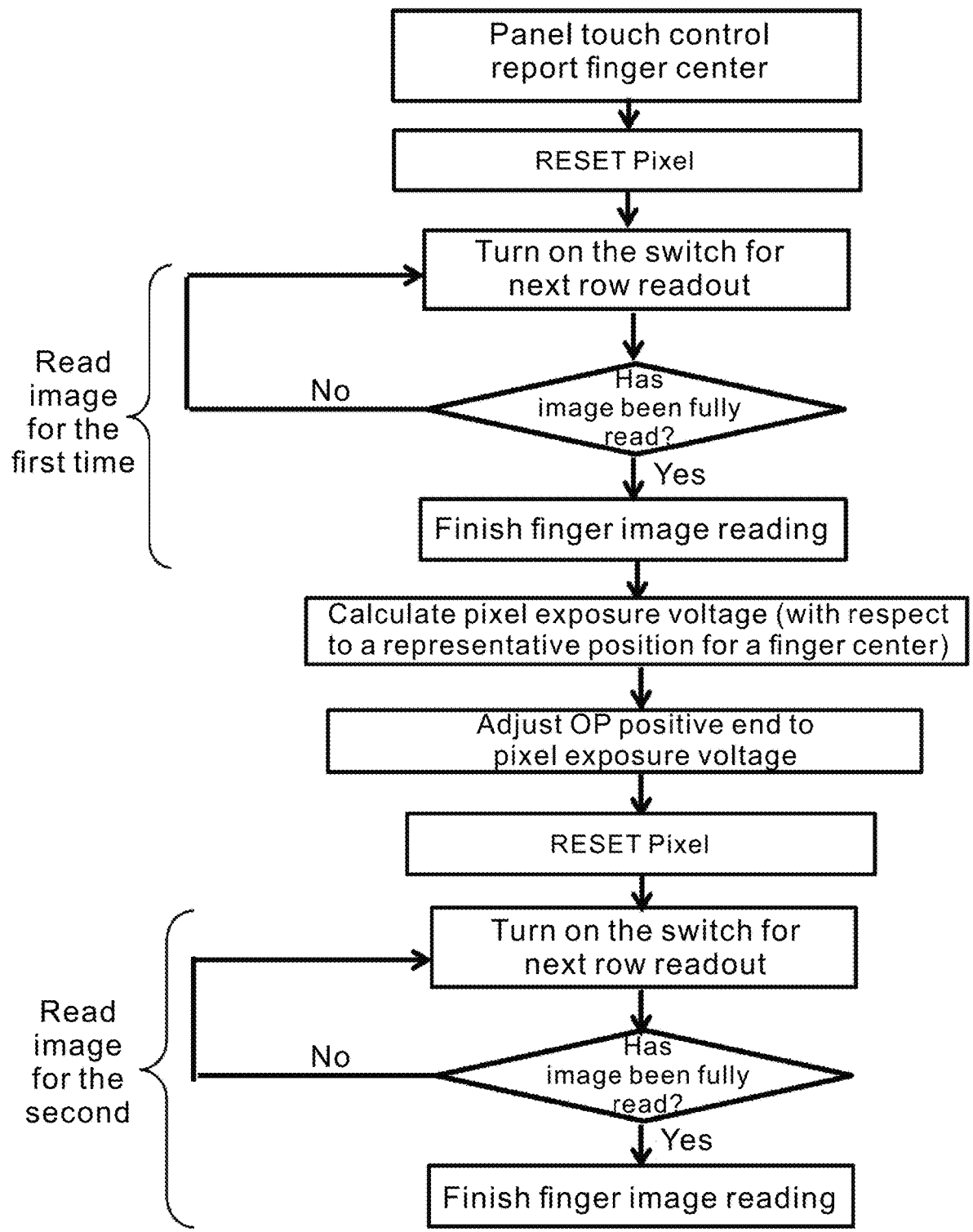
FIG. 4L is a flowchart of FTDI CDS reference voltage adaptation mechanism according to another embodiment of the present disclosure.

FIG. 4L is a flowchart of FTDI CDS reference voltage adaptation mechanism according to another embodiment of the present disclosure. As shown in FIG. 4L, the embodiment of the process includes first-instance image reading step and second-instance image reading step. In this embodiment, first-instance image reading is performed first, the appropriate CDS reference voltage is calculated with a computing unit. The voltage thus calculated is provided to the positive end of the OP and used as a reference voltage. Under this voltage, images of the entire finger are configured to be read fully and sequentially (second-instance image reading), so as to reduce AFE image reading convergence time and enhance the quality of AFE image reading.

Figure 4M:
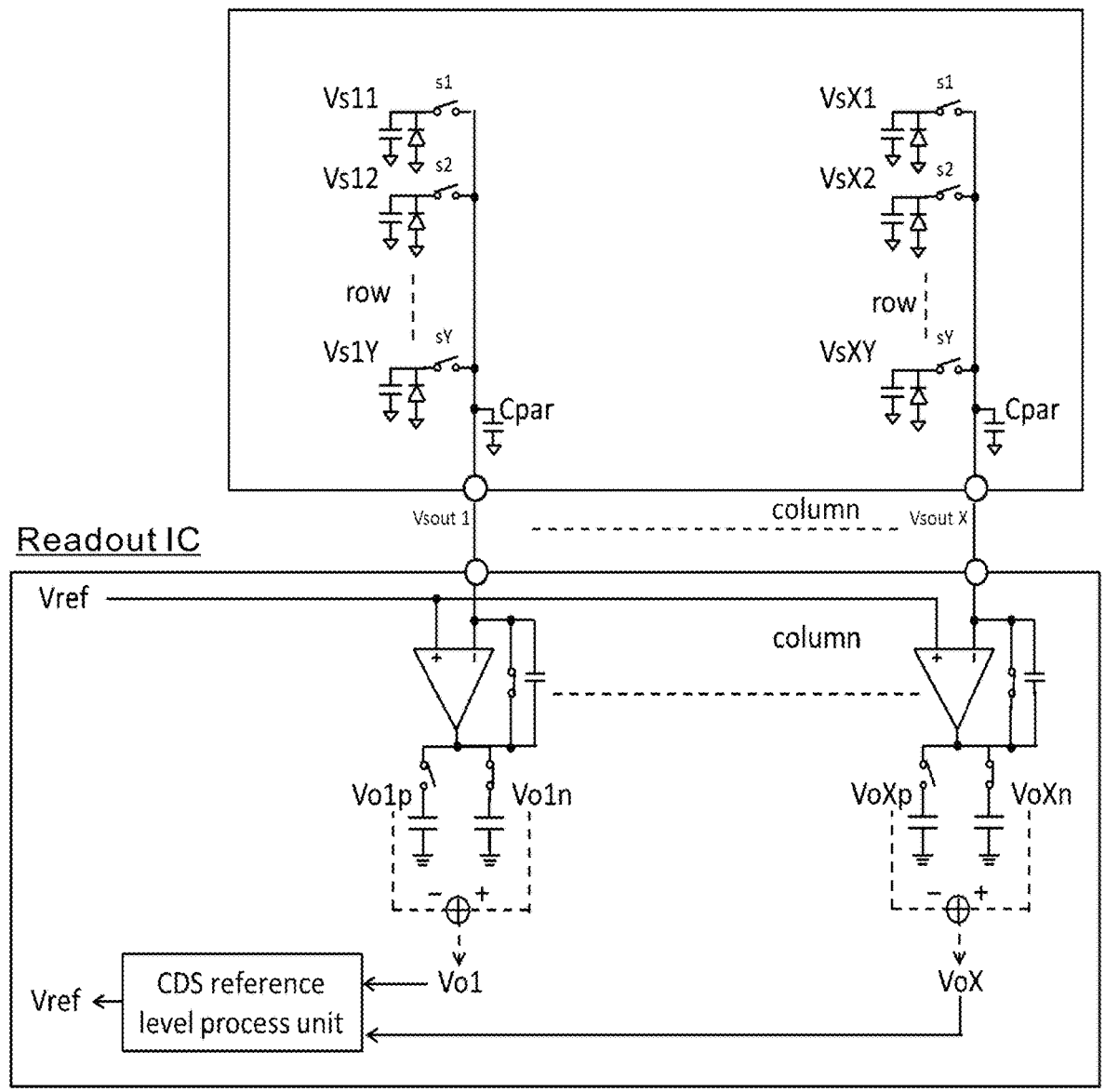
FIG. 4M is a block diagram of a display panel and a readout IC readout framework according to an embodiment of the present disclosure.

FIG. 4M is a block diagram of a display panel and a readout IC readout framework according to an embodiment of the present disclosure. FIG. 4M shows a circuit framework of the panel CDS reference voltage adaptation mechanism. First, a finger center position is selected and read out. Then, the finger center position is computed with a CDS reference level process unit for readout IC, so as to generate the required reference voltage. For the sake of readout, the required reference voltage is used by AFE as a reference voltage, thereby speeding up the convergence time required for AFE to effectuate CDS.

Figure 4N:
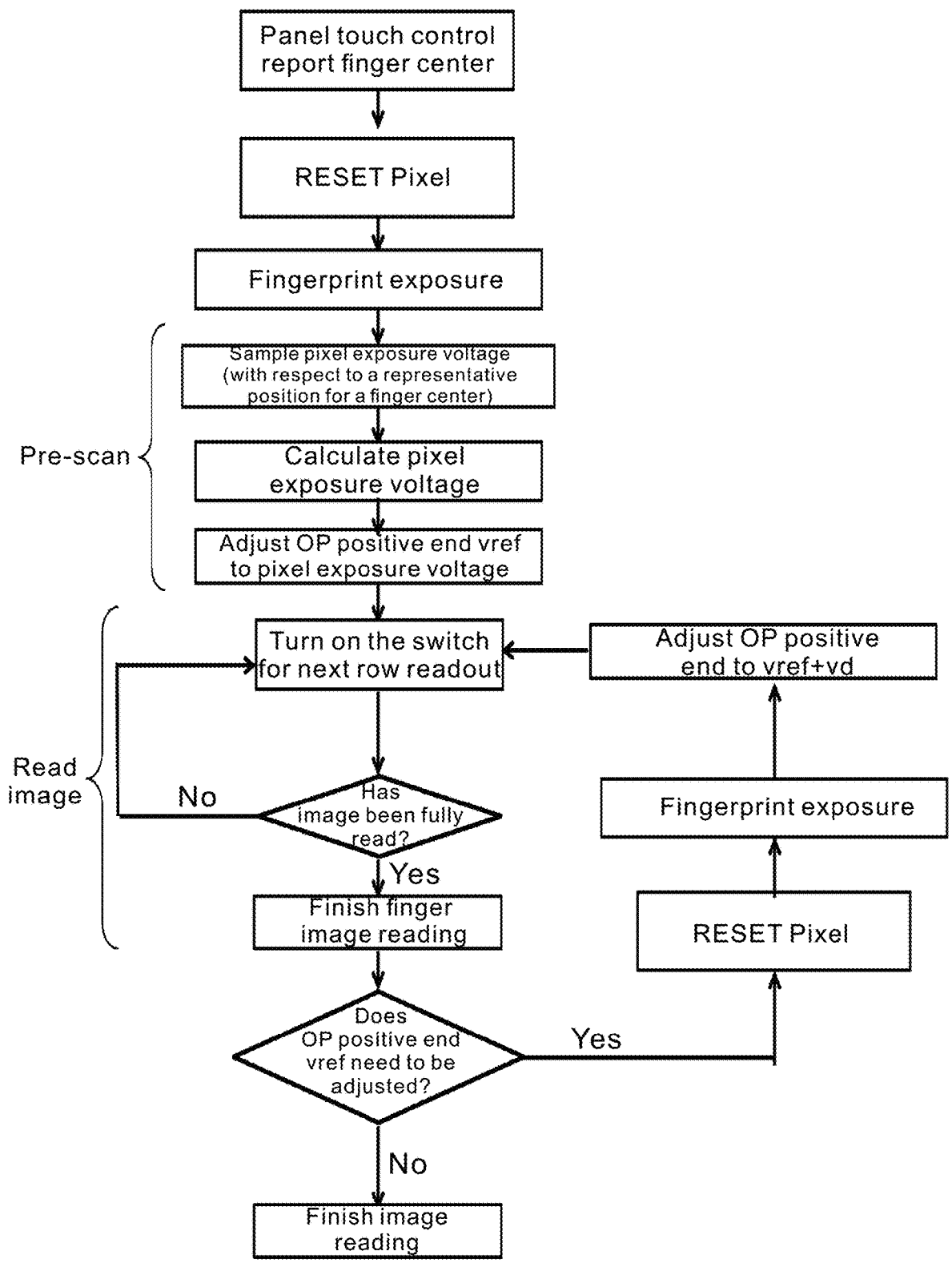
FIG. 4N is a flowchart of multi-tier CDS reference voltage adaptation readout process according to an embodiment of the present disclosure.

FIG. 4N is a flowchart of multi-tier CDS reference voltage adaptation readout process according to an embodiment of the present disclosure. As shown in FIG. 4N, in this embodiment, the process includes pre-scan step and image reading step. In this embodiment, as shown in FIG. 4N, to preclude dirt on the surface of the finger and prevent noise interference which might otherwise affect the precision of pre-readout, it is feasible to adjust Vref (for example, pre-scan) in multiple instances and then perform exposure and readout with a view to attaining optimal fingerprint images or integrate fingerprint features of multiple images with a view to forming optimal hybrid fingerprint patterns.

As shown in FIG. 4N, upon completion of fingerprint center readout, first-instance Vref is generated according to fingerprint center brightness so as to effectuate image reading. The Vref thus generated is used as a center and supplemented by Vd, so as to perform exposure and image reading anew to obtain readout images after Vref reference voltage adjustment. Then, the images are sent to the computing unit for determination and adjustment.

For instance, the voltage level of Vd is not only variable but also positive and/or negative, so as to effectuate multiple instances of exposure and image reading. Alternatively, completion of the first-instance pre-scan is followed by determination of the magnitude of Vd and the required number of instances of adjustment.

During the process illustrated by FIG. 4N, for example, the judgment criterion for the step "Does OP positive end Vref need to be adjusted?" is, for example, a criterion according to image quality, or a criterion according to the number of instances of reading, for example, whether the number of instances of reading meets a threshold (e.g., say, 2 or more).

Figure 4O:
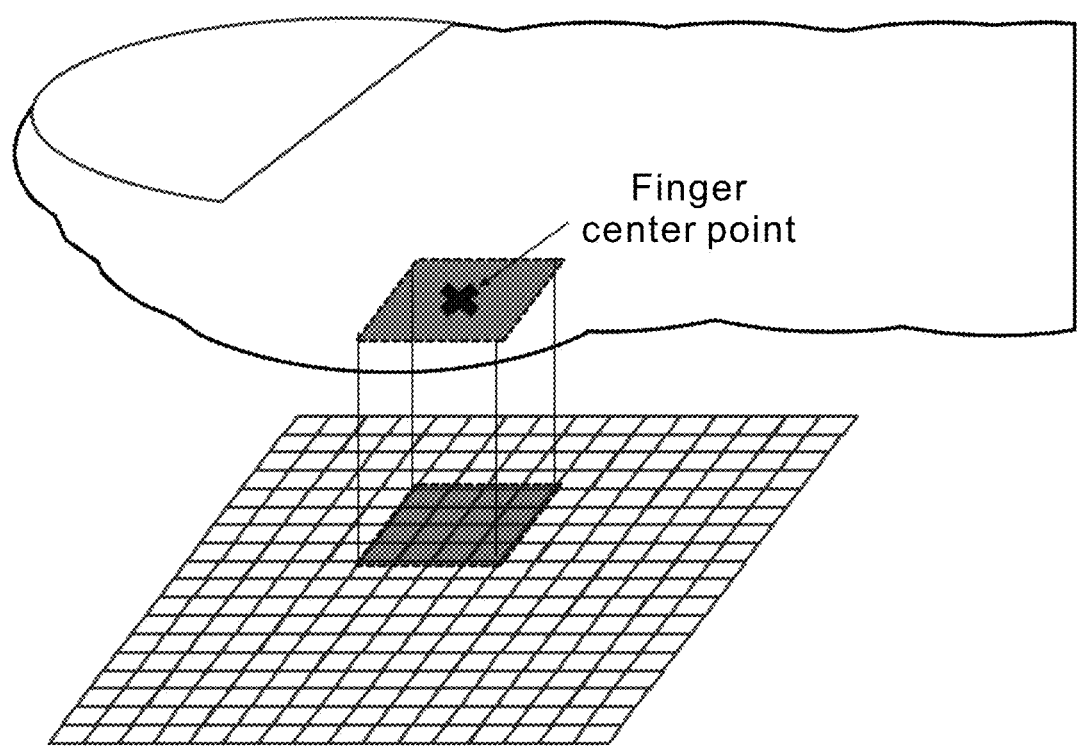
FIG. 4O is a schematic view of a pixel voltage prediction method according to an embodiment of the present disclosure.

In some embodiments or the aforesaid embodiments, with a pixel voltage prediction method, a process of pre-scanning voltage entails figuring out a voltage indicative of the finger voltage in order to adjust the CDS reference voltage. Referring to FIG. 4O, after the touch control panel has reported the finger center, exposure is followed by pre-readout to use a representative zone, such as 16 pixels (4×4), of the estimated fingerprint center (also known as finger center) to obtain the voltage of the 16 pixels, wherein the representative zone is any appropriate zone smaller than the initial fingerprint image zone, such as zones with 4×4, 6×6, 8×8 pixels or any other zones.

The representative zone is averaged (to figure out its mean, median or any number indicative of the representative zone) with the CDS reference level process unit of the readout IC, so as to substitute for the representative voltage indicative of the entire finger exposure voltage, generate a new CDS reference voltage and output the new CDS reference voltage to the positive end of the OP, thereby allowing the ensuing "normal reading" (for example, the entire zone, such as the initial fingerprint image zone) to take place under the new CDS reference voltage. Therefore, the present disclosure enhances the efficiency of adjustment.

Figure 4P:
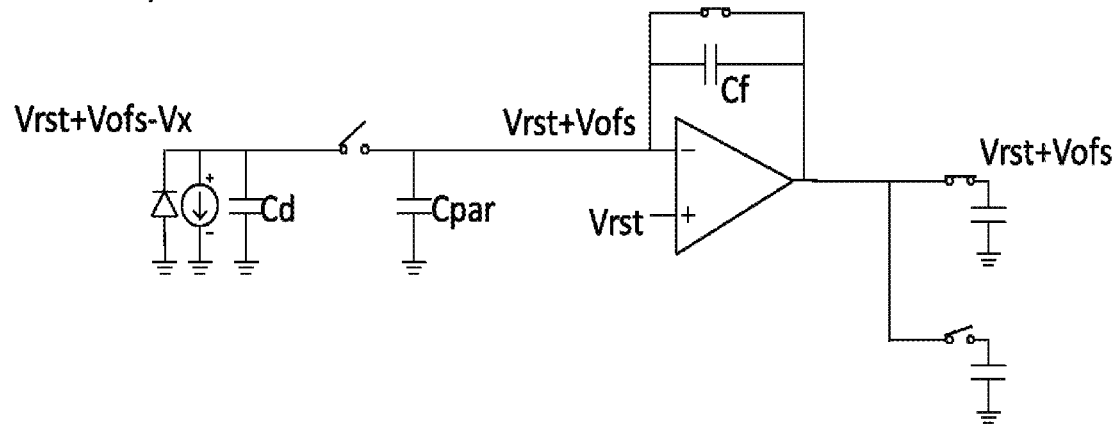
FIG. 4P schematically shows an example of operation of a loop in readout phase 1.
Figure 4Q:
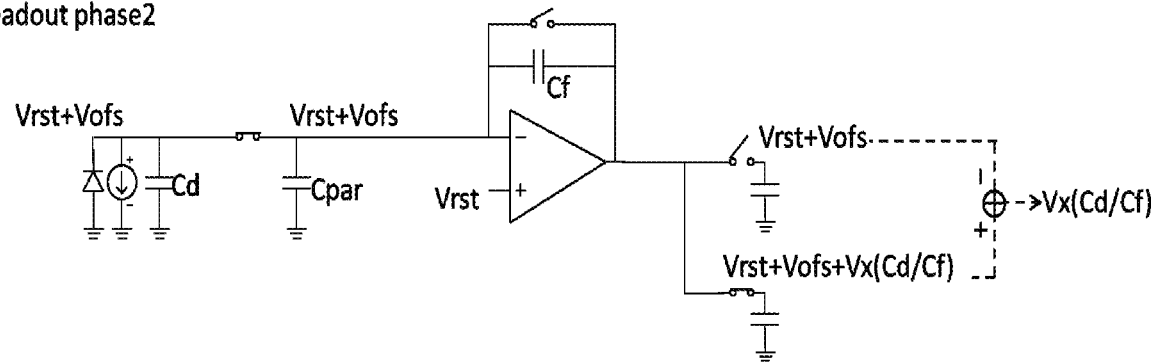
FIG. 4Q schematically shows an example of operation of a loop in readout phase 2.

In an embodiment, a method for figuring out a pre-scan voltage is provided. The representative voltage level of the finger center is obtained by pre-reading the voltage of a small number of pixels. As shown in FIG. 4P, in readout phase 1, the CDS1 voltage generated under Vrst (or other reference voltage) is read. As shown in FIG. 4Q, the CDS2 voltage is read in readout phase 2, so as to obtain Vx(Cd/Cf) difference. With Vrst, Cd, and Cf being known parameters and Vofs being negligibly small, the voltage level of Vrst+Vofs−Vx can be derived from Vx(Cd/Cf). The embodiments of the method for figuring out a pre-scan voltage are applicable to any embodiments of the aforesaid required pre-scan voltage.

In the aforesaid embodiments, the adjustment of the CDS reference voltage is effective in reducing the voltage difference of CDS in the two instances of sampling, reducing the stable time period required for the AFE output between the two instances of sampling, and thus enhancing the efficiency of capturing signals.

Furthermore, in some aforesaid embodiments, factors, namely the FPR module's operation speed and duration relative to FPR FRAME, determine whether reset, sampling and readout (also known as selecting or sensing) can be performed and finished within one fingerprint (FPR) FRAME (known as readout frame in the diagrams) and determine whether reset and readout are accomplished in at least one display frame, for example, in different FPR FRAMES. Therefore, the aforesaid examples are not restrictive of implementation of the present disclosure.

Regarding the practical application of the present disclosure, implementation of the present disclosure takes various forms. For example, even if the operation of the FPR module is too slow, the FPR module may be designed to allocate sufficient time to the FPR FRAME, such that reset, sampling and readout can be accomplished in one FPR frame.

For example, in an integrated IC (for example, IC dedicated to fingerprints and/or display, touch IC (FDTI), or any other IC capable of processing fingerprints), Display frames (or even touches) are interposed between multiple FPR frames. Furthermore, the display frames, FPR module and other frames differ in time-sharing modes. Therefore, the aforesaid examples are not restrictive of implementation of the present disclosure.

While the present disclosure has been described by means of specific embodiments, numerous modifications and variations or any combination thereof whenever appropriate could be made thereto by those skilled in the art without departing from the scope and spirit of the present disclosure.

What is claimed is:
1. An electronic module, comprising:
    a slew rate configuring circuit to generate and transmit at least one output signal to a gate on array (GOA) circuit of a panel; and a fingerprint sensing control circuit, coupled to a plurality of fingerprint sensing elements of the panel, to generate and transmit a plurality of control signals to the GOA circuit, wherein the fingerprint sensing control circuit controls the GOA circuit to generate a plurality of reset signals according to the at least one output signal and the slew rate configuring circuit controls a slew rate of a falling edge of each of the reset signals, the GOA circuit resets the fingerprint sensing elements respectively, wherein the control signals generated by the fingerprint sensing control circuit comprise a clock signal, and the reset signals are synchronized with the clock signal, wherein the slew rate of the falling edge of each of the reset signals is reduced to be less than a slew rate of a falling edge of the clock signal.

2. The electronic module according to claim 1, wherein the slew rate configuring circuit comprises a pulse generator circuit configured to generate a pulse signal serving as the at least one output signal and provide the pulse signal to the GOA circuit, wherein the pulse generator circuit is operable to configure the slew rate of the falling edge of each of the reset signals.

3. The electronic module according to claim 2, wherein the pulse generator circuit includes:
a first inverter having an input end for receiving an input signal and an output end, wherein the first inverter is powered by one or more current sources; and
a second inverter having an input end coupled to the output end of the first inverter and having an output end for outputting the pulse signal, wherein the input and output ends of the second inverter are coupled capacitively.

4. The electronic module according to claim 1, wherein the slew rate configuring circuit comprises a voltage level generator circuit configured to generate the plurality of output signals with a plurality of predetermined voltage levels and provide the plurality of output signals to the GOA circuit such that each of the reset signals transitions based on the predetermined voltage levels during the falling edge.

5. The electronic module according to claim 1, wherein the slew rate configuring circuit configures one of the reset signals having the falling edge that includes a down-sloping segment.

6. The electronic module according to claim 1, wherein the slew rate configuring circuit configures one of the reset signals having the falling edge that includes a plurality of down-sloping segments and falls in a piecewise manner.

7. The electronic module according to claim 1, wherein the slew rate configuring circuit configures one of the reset signals having the falling edge that includes at least one step and at least one segment and falls in a piecewise manner.

8. A computing apparatus comprising:
a panel comprising a gate on array (GOA) circuit and a plurality of fingerprint sensing elements;
a slew rate configuring circuit to generate and transmit at least one output signal to the GOA circuit; and
a fingerprint sensing control circuit, coupled to the fingerprint sensing elements, to generate and transmit a plurality of control signals to the GOA circuit, wherein the fingerprint sensing control circuit controls the GOA circuit to generate a plurality of reset signals according to the at least one output signal, the slew rate configuring circuit controls a slew rate of a falling edge of each of the reset signals, and the GOA circuit resets the fingerprint sensing elements respectively, wherein the control signals generated by the fingerprint sensing control circuit comprise a clock signal, and the reset signals are synchronized with the clock signal, wherein the slew rate of the falling edge of each of the reset signals is reduced to be less than a slew rate of a falling edge of the clock signal.

9. The computing apparatus according to claim 8, wherein the slew rate configuring circuit comprises a pulse generator circuit configured to generate a pulse signal serving as the at least one output signal and provide the pulse signal to the GOA circuit, wherein the pulse generator circuit is operable to configure the slew rate of the falling edge of each of the reset signals.

10. The computing apparatus according to claim 9, wherein the pulse generator circuit includes:
a first inverter having an input end for receiving an input signal and an output end, wherein the first inverter is powered by one or more current sources; and
a second inverter having an input end coupled to the output end of the first inverter and having an output end for outputting the pulse signal, wherein the input and output ends of the second inverter are coupled capacitively.

11. The computing apparatus according to claim 8, wherein the slew rate configuring circuit comprises a voltage level generator circuit configured to generate the plurality of output signals with a plurality of predetermined voltage levels and provide the plurality of output signals to the GOA circuit such that each of the reset signals transitions based on the predetermined voltage levels during the falling edge.

12. The computing apparatus according to claim 8, wherein the slew rate configuring circuit configures one of the reset signals having the falling edge that includes a down-sloping segment.

13. The computing apparatus according to claim 8, wherein the slew rate configuring circuit configures one of the reset signals having the falling edge that includes a plurality of down-sloping segments and falls in a piecewise manner.

14. The computing apparatus according to claim 8, wherein the slew rate configuring circuit configures one of the reset signals having the falling edge that includes at least one step and at least one segment and falls in a piecewise manner.

15. The computing apparatus according to claim 8, wherein the slew rate configuring circuit and the fingerprint sensing control circuit are implemented in a single chip.

16. The computing apparatus according to claim 8, wherein the fingerprint sensing control circuit is implemented in a single chip and the slew rate configuring circuit is disposed externally to the single chip and on the panel.

17. The computing apparatus according to claim 8, wherein the GOA circuit comprises a plurality of shift registers and a plurality of switches, each of the shift registers is configured to receive at least a corresponding one of the control signals and is coupled to a corresponding one of the switches to generate a corresponding one of the reset signals according to the at least one output signal.

18. The computing apparatus according to claim 8, wherein the GOA circuit comprises a plurality of shift registers, each of the shift registers is configured to receive at least a corresponding one of the control signals and is coupled to the slew rate configuring circuit to generate the plurality of reset signals with a plurality of predetermined voltage levels such that each of the reset signals transitions based on the predetermined voltage levels during the falling edge.

19. A panel comprising:
a panel body;
a gate on array (GOA) circuit disposed on the panel body; and
a plurality of fingerprint sensing elements disposed on the panel body and coupled to the GOA circuit;
wherein the GOA circuit is configured to receive a plurality of control signals provided by a fingerprint sensing control circuit, wherein the control signals are provided for controlling the GOA circuit to generate a plurality of reset signals according to at least one output signal provided by a slew rate configuring circuit, and the GOA circuit resets the fingerprint sensing elements respectively, wherein a slew rate of a falling edge of each of the reset signals is capable of being configured by the slew rate configuring circuit,
wherein the control signals comprise a clock signal, and the reset signals are synchronized with the clock signal,
wherein the slew rate of the falling edge of one of the reset signals is reduced to be less than a slew rate of a falling edge of the clock signal.

20. The panel according to claim 19, wherein the GOA circuit is configured to receive the at least one output signal having the falling edge that includes a down-sloping segment.

21. The panel according to claim 19, wherein the GOA circuit is configured to receive the at least one output signal having the falling edge that includes a plurality of down-sloping segments and falls in a piecewise manner.

22. The panel according to claim 19, wherein the GOA circuit is configured to receive the at least one output signal having the falling edge that includes at least one step and at least one segment and falls in a piecewise manner.

23. The panel according to claim 19, wherein the GOA circuit is configured to be coupled to the slew rate configuring circuit and the fingerprint sensing control circuit that are implemented in a single chip.

24. The panel according to claim 19, wherein the GOA circuit is configured to be coupled to the fingerprint sensing control circuit that is implemented in a single chip and the slew rate configuring circuit that is disposed externally to the single chip and is on the panel.

25. The panel according to claim 19, wherein the GOA circuit comprises a plurality of shift registers and a plurality of switches, each of the shift registers is configured to receive at least a corresponding one of the control signals and is coupled to a corresponding one of the switches to generate a corresponding one of the reset signals based on the at least one output signal.

26. The panel according to claim 19, wherein the GOA circuit comprises a plurality of shift registers, each of the shift registers is configured to receive at least a corresponding one of the control signals and is coupled to the slew rate configuring circuit to generate the plurality of reset signals with a plurality of predetermined voltage levels such that each of the reset signals transitions based on the predetermined voltage levels during the falling edge.

* * * * *